US010856024B2

United States Patent
Kahler

(10) Patent No.: US 10,856,024 B2
(45) Date of Patent: Dec. 1, 2020

(54) AUDIO SYNCHRONIZATION OF CORRELATED VIDEO FEEDS

(71) Applicant: MICROSOFT TECHNOLOGY LICENSING, LLC, Redmond, WA (US)

(72) Inventor: David Elliott Kahler, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/366,538

(22) Filed: Mar. 27, 2019

(65) Prior Publication Data

US 2020/0314468 A1 Oct. 1, 2020

(51) Int. Cl.
*H04J 3/06* (2006.01)
*H04N 21/242* (2011.01)
(Continued)

(52) U.S. Cl.
CPC ......... *H04N 21/242* (2013.01); *H04L 65/601* (2013.01); *H04L 65/80* (2013.01);
(Continued)

(58) Field of Classification Search
CPC ... G06F 16/739; H04L 12/1827; H04L 29/06; H04L 43/08; H04L 47/10; H04L 47/24;
(Continued)

(56) References Cited

U.S. PATENT DOCUMENTS 8,682,144 B1 * 3/2014 Zhang ................ G06K 9/00765
386/201
9,392,322 B2 7/2016 Thorson
(Continued)

FOREIGN PATENT DOCUMENTS

FR 3012906 A2 5/2015

OTHER PUBLICATIONS

Benesty et al, On the Importance of the Pearson Correlation Coefficient in Noise Reduction, IEEE, 9 pages, May 2008.*
"International Search Report and Written Opinion Issued in PCT Application No. PCT/US20/023470", dated Jun. 16, 2020, 10 Pages.

*Primary Examiner* — Frank Duong
(74) *Attorney, Agent, or Firm* — Workman Nydegger

(57) ABSTRACT

Systems and methods are provided for synchronizing audio feeds. A system obtains a plurality of audio feeds and identifies a base feed, a first feed, a base segment, and a first segment. The system also determines a plurality of time-shifted first segments that are each temporally offset from the first segment by a unique multiple of a granularity parameter. A plurality of correlation values between the base segment and each of the plurality of time-shifted first segments are also determined, as well as a first offset value corresponding to a particular time-shifted first segment of the plurality of time-shifted first segments having the highest correlation value. The first feed and/or supplemental content of the first feed is then synchronized with the base feed by at least temporally offsetting the first feed and/or supplemental content of the first feed by a temporal offset comprising/based on the selected first offset value.

23 Claims, 12 Drawing Sheets

(51) Int. Cl.
  *H04N 21/233*    (2011.01)
  *H04L 29/06*     (2006.01)
  *H04N 21/218*    (2011.01)
  *H04N 21/236*    (2011.01)

(52) U.S. Cl.
  CPC ......... *H04N 21/218* (2013.01); *H04N 21/233* (2013.01); *H04N 21/236* (2013.01)

(58) Field of Classification Search
  CPC ..... H04L 47/805; H04L 65/601; H04L 65/80; H04L 67/04; H04L 67/18; H04L 67/28; H04L 67/2828; H04L 67/322; H04N 5/04; H04N 7/24; H04N 9/475; H04N 21/218; H04N 21/2187; H04N 21/233; H04N 21/236; H04N 21/2402; H04N 21/242; H04N 21/2665; H04N 21/43; H04N 21/4307; H04N 21/44209
  See application file for complete search history.

(56) References Cited

U.S. PATENT DOCUMENTS

| | | | |
|---|---|---|---|
| 9,602,858 B1* | 3/2017 | Kaiser | H04N 21/4307 |
| 2009/0049979 A1* | 2/2009 | Naik | G10H 1/40 |
| | | | 84/636 |
| 2017/0230610 A1* | 8/2017 | Tcheng | G11B 27/031 |

* cited by examiner

AUDIO SYNCHRONIZATION OF CORRELATED VIDEO FEEDS

BACKGROUND

Video and content producers often utilize a plurality of different cameras positioned at different locations, relative to the subject matter being filmed. They may also utilize one or more microphones for recording the relevant audio. In many instances, the recording devices (e.g., cameras, microphones) used by content producers are independent of one another. For example, a video producer could use a set of cameras (each with audio recording capability) for video recording as well as a dedicated microphone for audio recording, each device having its own separate, independent hardware. A producer may wish to utilize the audio recording from the best audio recording device (or from the device that actually obtained the highest quality recording in the ambient conditions it was exposed to) and mix that audio recording with the best video recording(s) from one or more different camera device(s), to generate a mixed product that has high quality video and audio content. This is a typical process used in industry because it is unlikely that a single device will obtain both, the quality video and the highest quality audio.

However, in some mixed recording embodiments, it is likely that the various recording devices will not actually begin recording the subject matter at the exact same real-world time, even if the input to begin recording is executed at each device simultaneously (e.g., because of differences in drivers, processor enqueuing times, etc.). Thus, the feeds from the various devices will need to be synchronized in post-processing/recording operations in order to prevent a detectable disparity between the video feed(s) and/or the audio feed(s) (e.g., to avoid lip synchronization issues).

When using cameras that are all perfectly synced to a common clock with a common timestamping schema, the timestamps of the recordings can be used to synchronize the camera recordings. However, there still may be difficulty in synchronizing the audio recordings to the video recordings with sufficient accuracy to be undetectable by the audience viewing the mixed recordings.

Additionally, when devices such as common phone cameras or composite video/audio recorders are being used to do some of the filming/audio recording, the synchronization problems are even more pronounced because it is likely that these devices will have clocks that are not perfectly synced with the clocks of the other recording devices. Because of this, the timestamps of the different recordings will be slightly offset from each other and cannot be relied upon for syncing the different recordings.

Potential solutions for synchronizing the audio and/or video feeds from the various recording devices include manual user intervention, wherein a user synchronizes the various feeds by hand with post-processing software. These solutions, however, rely entirely on the judgment of the person or persons performing the synchronization with the post-processing software, resulting in limited productivity and subjecting the synchronization process to error.

Accordingly, there exists a need to improve systems and methods for synchronizing multiple audio/video feeds, particularly for circumstances in which the clocks of the different devices are not perfectly in sync and/or when the different recordings do not all begin and end at the exact same time.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for synchronizing multiple audio feeds.

In some embodiments, a system obtains a plurality of audio feeds, each having a plurality of audio samples that are obtained over a given duration of time. The system then identifies a base feed and a first feed from the plurality of audio feeds, as well as a base segment of the base feed and a first segment of the first feed. Subsequently, the system determines a plurality of time-shifted first segments, each of the plurality of time-shifted first segments being temporally offset from the first segment by a unique multiple of a granularity parameter. The system also determines a plurality of correlation values between the base segment and the plurality of time-shifted first segments, including a separate correlation value for each of the plurality of time-shifted first segments relative to the base segment. The system also identifies a particular time-shifted first segment from the plurality of time-shifted first segments that has a highest correlation value from the plurality of correlation values. Subsequently, the system determines a first offset value corresponding to the particular time-shifted first segment having the highest correlation value and synchronizes the first feed with the base feed by at least temporally offsetting the first feed by a temporal offset that is based on the selected first offset value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
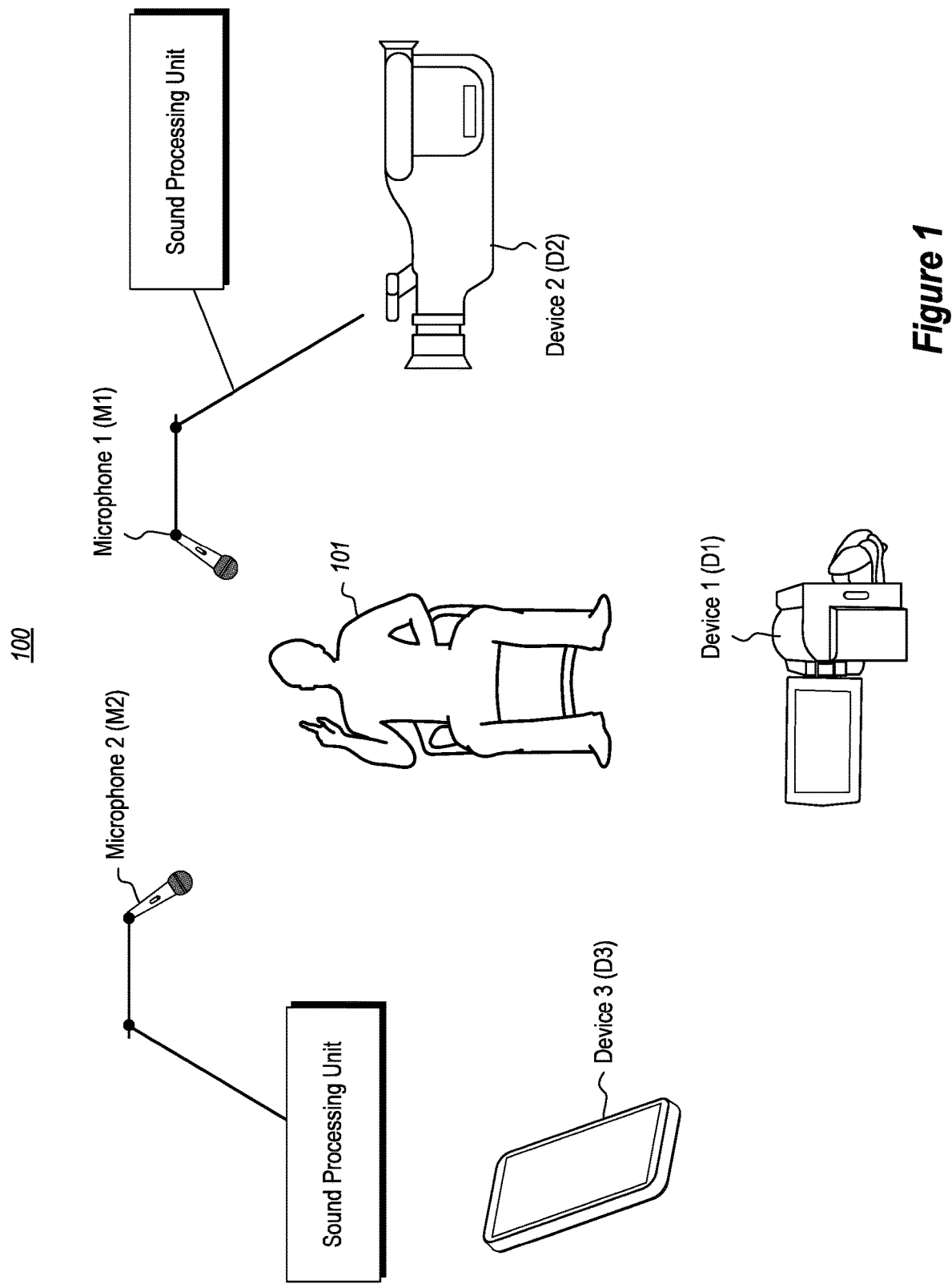
FIG. 1 illustrates a recording environment/scenario in which multiple recording devices are recording an event.

Disclosed embodiments include systems and methods for synchronizing multiple audio recordings, wherein each of the audio recordings is also referred to herein as an audio feed, or simply as a feed.

Each feed may be an entire/complete audio file or only a limited/incomplete portion of an audio file for a corresponding recorded event. Different feeds may be recorded in different audio formats (e.g., WAV, AIFF, MP3, AAC, WMA, etc.) and the disclosure presented herein is not limited to any particular type or format of an audio feed.

In many instances, content producers utilize multiple recording devices, including cameras and microphones, to capture an event. The cameras are often positioned at different angles so as to record video of the event from different angles. Furthermore, some content producers utilize standalone microphones or combination camera/microphone devices/systems to record audio for the event.

Some recording device systems, particularly those used in major motion picture productions, record with synchronized time stamps that are all perfectly synchronized to a common base clock/system. This allows producers to easily edit and/or combine recordings from the various recording devices of the set to generate time-synchronized content. Such specialized equipment, however, is expensive and not generally available to lay content producers. Furthermore, even when such specialized equipment is used, slight variations in processors and drivers of the different devices can cause the audio feeds and tagged time stamps applied to the feeds to be out-of-sync.

Additionally, when stand-alone devices are used to record the audio (independent of the camera/video recordings) there may not be any consistency in the timestamping schemes that are applied, from which the different audio feeds can be synchronized together and/or with the different video feeds. For example, a camera and a standalone microphone may have different driver instantiation time periods (and the camera will require spool time), and there will thus be a time offset between when the two recording devices begin to record an event (even if input to begin recording is provided to the camera and the standalone microphone simultaneously). If the video recording of the camera is combined with the audio recording of the standalone microphone, the time offset between when the two devices began recording will be evident and unappealing to the viewing audience in the final content (e.g., lip asynchronization).

Accordingly, in order to edit and/or combine recordings from various recording devices to generate time-synchronized content, lay content producers must utilize post-processing software (e.g., video editing software) and manually temporally offset the various recordings with respect to one another. This solution, however, relies entirely on the judgment of the lay content producer performing the synchronization with the post-processing software, resulting in limited productivity and subjecting the synchronization process to error.

This disclosure includes embodiments which may address some or all of the aforementioned challenges with generating time-synchronized content recorded from independent recording devices. In some instances, this may be accomplished automatically in response to obtaining different audio feeds, to thereby synchronize the different audio feeds, and which may be used to further synchronize the video associated with the different feeds to one or more different audio feeds recorded with one or more different devices.

In some embodiments, a system obtains multiple audio feeds (which may have associated video or other content, such as may be recorded on combination camera/microphone devices) and temporally shifts one audio feed (or a segment thereof) with respect to another audio feed (or a segment thereof) from a different device and generates a correlation value between the two audio feeds. Several temporal shifts are then automatically applied/performed with the audio feeds, relative to each other, to generate several corresponding correlation values between the temporal shifts/offsets of the two feeds (each correlation value corresponding to a different temporal shift). The system then identifies an offset value associated with the temporal shift resulting in the highest correlation value and synchronizes the two audio feeds, based on that highest correlation value, by offsetting one of the feeds by the magnitude of that offset value that generated the highest correlation value. In some instances, the foregoing process is iteratively, to further tune the synchronization of the feeds, by using incrementally smaller and different temporal shift sizes between the feeds to identify a more refined offset value and corresponding maximum correlation value between the new temporal offsets. The foregoing processing can be applied automatically and/or to multiple different feeds, even more than two audio feeds.

Those skilled in the art will recognize that, in some instances, the embodiments disclosed herein provide significant benefits over conventional systems and methods for synchronizing multiple feeds. For example, some disclosed embodiments provide users with an automatable process for synchronizing otherwise time-asynchronous recordings, which is not subject to human error and which greatly improves efficiency and production value and quantity.

Having just described some of the various high-level features and benefits of the disclosed embodiments, attention will now be directed to FIGS. 1 through 12. These figures illustrate various functionalities, examples, supporting illustrations, systems, and methods related to synchronizing multiple audio feeds.

FIG. 1 illustrates an exemplary scenario 100 in which multiple recording devices (e.g., Microphone 1, Microphone 2, Device 1, Device 2, and Device 3) are recording an event.

In this example, the recorded event is a speaking event, in which an actor is being filmed/recorded. The actor and the actor(s) voice, which are recorded as part of the speaking event, are collectively referred to in the illustration as subject 101. As shown, several recording devices are simultaneously recording the subject 101. For example, Device 1 ("D1") is a camcorder being used to capture subject 101, Device 2 ("D2") is a video camera being used to record subject 101 from a different angle and distance, and Device 3 ("D3") is a smartphone with video recording functionality being used to capture subject 101 from yet another angle and distance. Also, Microphone 1 ("M1") is a standalone microphone arranged to record audio of the event (e.g., the words spoken by subject 101), and Microphone 2 ("M2") is a standalone microphone situated to record audio of the event from another position with respect to subject 101.

It should be noted that, in the illustrated embodiment, each recording device (i.e., M1, M2, D1, D2, D3) is at least configured to record audio for the event. M1 and M2 are standalone microphones configured to record only audio. In addition to a camera element for capturing video, D1, D2, and D3 each have an associated microphone (e.g., an internal microphone) which is configured to record audio. Accordingly, each recording device is configured to record audio associated with subject 101. As will be discussed in more detail below, the audio feeds from the various devices may be used, according to disclosed embodiments, to temporally synchronize the various recordings of the recording devices, even though they are not presynchronized with a common/synchronized clock or timestamp schema and/or when they may begin and end the recording of the subject 101 at different times.

In the illustrated embodiment, each recording device (i.e., M1, M2, D1, D2, D3) is independent of one another with its own independent hardware. For example, as illustrated, M1 and M2 each have separate/individualized sound processing units, indicating that M1 and M2 are not extensions of D1, D2, or D3. Because each recording device is independent of one another, the time stamps for the devices will not be automatically synchronized when the devices are instructed to start recording subject 101 (even if the instruction to begin recording is provided to each recording device simultaneously in real time). This is due to the different devices and sound processing units utilizing different combinations of recording software/drivers and processors that are operating at slightly different clock speeds.

By way of example, if an instruction is simultaneously provided to M1 and D2 to begin recording subject 101, M1 and D2 will begin actually recording subject 101 at different real-world times (e.g., because of differences in drivers, enqueuing times, software, device processor/processing capabilities, power variations, etc.). Therefore, if the video feed recorded by D2 is combined with the audio feed recorded by M1, based on the audio or video timestamps of video feed D2, to create mixed content (e.g., which may be desirable because the sound quality of the M1 audio feed is superior to that of the D2 feed), there will be a detectable temporal disparity between the resulting video feed and audio feed (e.g., lip asynchronization). A similar problem might arise if the video feed of D3 (based solely on the video or audio feed timestamps of D3) was combined with the audio feed of D2, M1, or M2, either in whole or in part.

Therefore, any recordings from the devices will not be automatically temporally synchronized, and additional post-recording/processing will be required in order to facilitate additional editing/combining of the recordings (e.g., video from one device with audio of another device) to produce synchronized content relying on the disparate devices.

Figure 2:
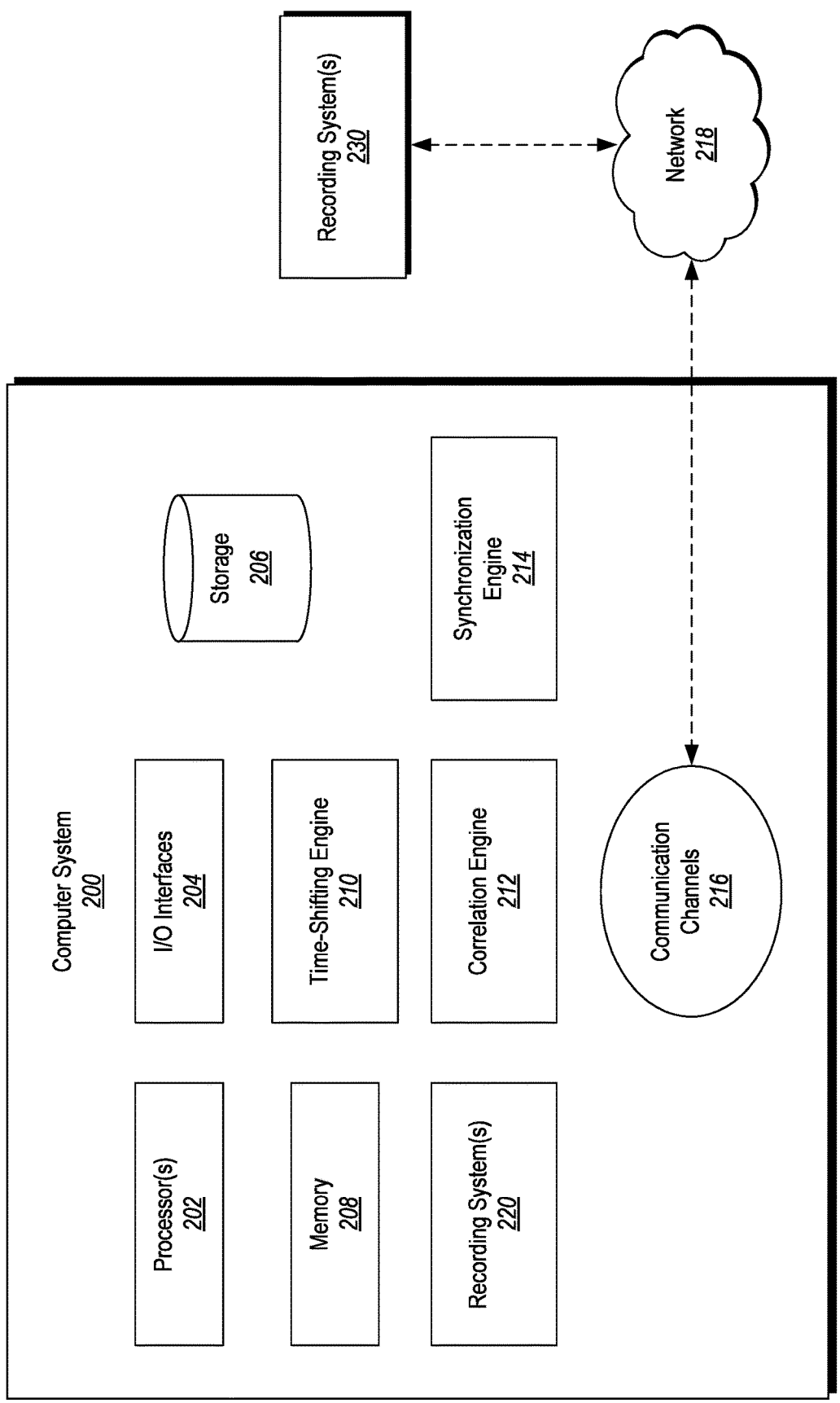
FIG. 2 illustrates a computing system that may include and/or be used to perform the disclosed and claimed embodiments.

Attention is now directed to FIG. 2, which illustrates an embodiment of a computing system that may include or be used to perform embodiments disclosed herein, for facilitating the synchronization of audio feeds from different devices.

As illustrated, the computer system 200 includes one or more processors 202, I/O interfaces 204, storage 206, memory 208, and communication channels 216 connected to a network 218.

The computer system 200 also includes or is connected to one or more recording systems (e.g., local recording system(s) 220 and remote and or at least temporarily disconnected recording system(s) 230).

The recording systems 220, 230 referenced in Figure to are similar, in some instances to the recording devices and systems described above in reference to FIG. 1. In particular, the recording devices 220, 230 indicated in FIG. 2 include, in some embodiments, at least a sound recording element (e.g., a microphone) for recording an audio feed. Recording devices 220, 230 can also include one or more camera or video capture elements for recording a video feed (comprising image/video frames).

In addition to the microphone and/or camera components for recording audio and video feeds, those skilled in the art will recognize that the recording systems 220, 230 can also include other software and hardware components for recording/generating other data associated with a recorded audio and/or video feed, such as auto-generated closed captioning, annotations, tags, time markers (e.g., chapter markers), and other metadata associated with recorded content.

Furthermore, it will be appreciated that, in some embodiments, recording devices 220, 230 may also include their own dedicated internal processors (e.g., ASIC, GPU, etc.), I/O interfaces, storage, memory, and/or communication channels. The recording devices may also be configured as or include field-programmable gate arrays (FPGAs), program-specific or application-specific integrated circuits (ASICs), program-specific standard products (ASSPs), system-on-a-ship systems (SOCs), complex programmable logic devices (CPLDs), and/or as one or more or sets of computer-executable instructions stored on one or more hardware storage devices and/or other computer-readable media.

Computer system 200 is also illustrated as incorporating a time-shifting engine 210, a correlation engine 212, and a synchronization engine 214. As will be discussed in more detail throughout this disclosure, these engines are each configured to perform certain/corresponding functions associated with synchronizing multiple audio feeds. Although the time-shifting engine 210, the correlation engine 212, and the synchronization engine 214 are illustratively represented as logically separate entities in FIG. 2, those skilled in the art will appreciate that the functions that will be described herein as associated with one or more of these engines can be combined, in some instances, and may be performed by any number of combined/distributed software or hardware logic components.

The time-shifting engine 210, the correlation engine 212, and/or the synchronization engine 214 may be embodied as one or more central or specialized processing units (e.g., with any number of cores), field-programmable gate arrays (FPGAs), program-specific or application-specific integrated circuits (ASICs), program-specific standard products (ASSPs), system-on-a-ship systems (SOCs), complex programmable logic devices (CPLDs), and/or as one or more or sets of computer-executable instructions stored on one or more hardware storage devices and/or other computer-readable media.

As shown, the computer system 200 is operatively connected to one or more recording systems 220, 230 (whether via an intermediate network 218 or not). Accordingly, the computer system 200 is able to receive (e.g., in memory 208 or storage 206) information from the recording systems 220, 230, such as audio feeds, video feeds, and/or other information associated therewith. Put differently, the computer system 200 is able to obtain a plurality of audio feeds, wherein each feed includes a plurality of audio samples over time. Additionally, or alternatively, the recording systems 220, 230 may include their own internal software or hardware logic components for executing processes for synchronizing multiple feeds from multiple recording systems 220, 230.

Figure 3:
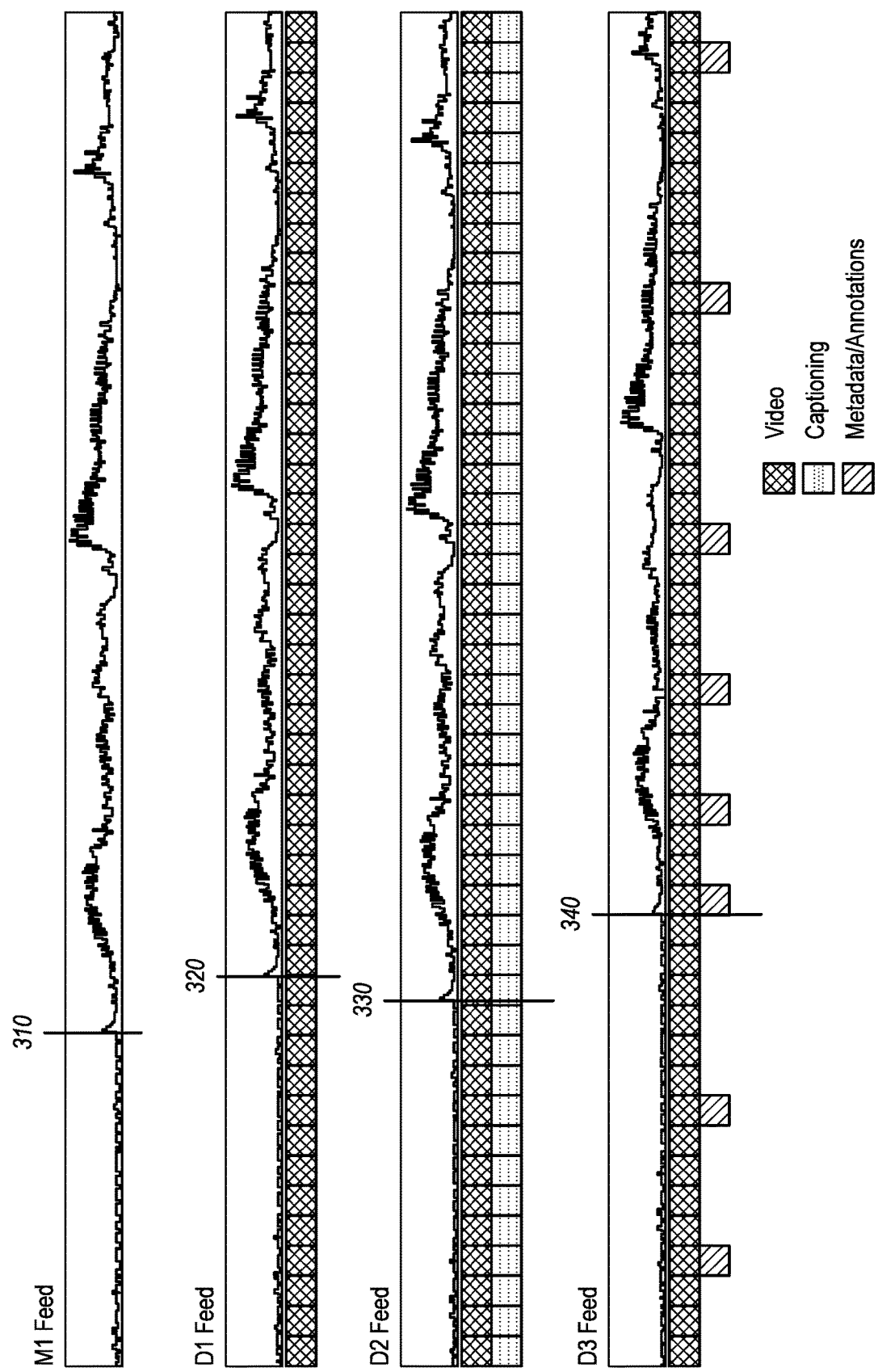
FIG. 3 illustrates a plurality of feeds associated with different recording devices.

FIG. 3 illustrates an example of various recorded audio feeds (and other recorded data) associated with recording devices, such as the recording devices shown in FIG. 1 and which may correspond to the speaking event and corresponding recording of subject 101.

As shown, FIG. 3 comprises an M1 Feed, a D1 Feed, a D2 Feed, and a D3 Feed. Each of these feeds includes an audio component (e.g., an audio feed), which includes audio samples over time. In addition to an audio feed, the D1 Feed includes a video feed recorded by D1, the D2 Feed includes a video feed and closed captioning data, and the D3 Feed includes a video feed and metadata/annotations. It will be appreciated that the video feeds, captioning, and/or metadata/annotations of the camera devices (D1, D2, and D3) are associated with the audio feeds of each respective camera device. For example, the video frames of the video feed of D1 are temporally synchronized with the audio samples of the audio feed of D1, in particular because both feeds capture the same underlying real-world event (e.g., subject 101, referred to in FIG. 1) from a single device having temporally synchronized recording components/systems (e.g., audio recording system and video recording system).

Although no reference is made to an M2 recording in FIG. 3, from the M2 device in FIG. 1, those skilled in the art will recognize that any number of recording systems (e.g., microphones and/or cameras) may be utilized in practicing the embodiments disclosed herein. The M2 recording may have been scrapped, as having been undesirable by the producer, and/or the M2 device may have malfunctioned, for example. This is one reason why professionally recorded events are often recorded with multiple different devices, to mitigate against unexpected failures.

Notwithstanding the quantity of feeds shown in the figures/examples of this disclosure, it will be appreciated by those skilled in the art that the quantity, as well as the illustrated types and waveforms of the feeds that are illustrated in the present disclosure are exemplary only and are, therefore, non-limiting.

As is evident from the similarity of the waveform features shown in the M1, D1, D2, and D3 Feeds (particularly the audio feeds associated with each), the various recording systems of FIG. 3 recorded the same event at approximately the same time and duration (to generate the various feeds shown (e.g., subject 101 of FIG. 1). There are, however, some differences between the waveforms. For example, the amplitude of the audio samples of the D3 Feed is lower than the amplitude of the audio samples of the M1 Feed. This can occur, for example, because of the proximity of the individual recording systems to the event, and/or hardware or software characteristics/settings of each individual recording system.

It is furthermore evident that the feeds shown in FIG. 3 are temporally out of synchronization. For example, a first peak of the D2 Feed 330 occurs later than a first peak of the M1 Feed 310 but earlier than a first peak of the D1 Feed 320 and a first peak of the D3 Feed 340 (refer to the time axis, t, shown in FIG. 3). As noted above, this temporal asynchronization may occur as a result of differences in driver instantiation timing for the various recording devices and/or because of differences in spool time for cameras. For example, D3 (the smartphone) can have a longer driver instantiation and spool time than D2 (the video camera), D1 (the camcorder), and/or the microphone.

Because of the aforementioned temporal asynchronization, the M1, D1, D2, and D3 Feeds are considered "out-of-sync," and thus the feeds of the various devices are not combinable/interchangeable for editing purposes. For example, a content producer cannot simply combine the video feed of the D2 Feed with the audio feed of the M1 Feed without having a resulting lip synchronization issue between the combined feeds.

It is further evident that the M1, D1, D2, and D3 Feeds are similar in duration. This is, for instance, because instructions to begin and end recording the underlying event were provided to each of the recording devices, M1, D1, D2, and D3 at simultaneous (or nearly simultaneous) times, even though their clocks/timestamps (or at least processed recording times of the audio content) are out of sync.

Figure 4:
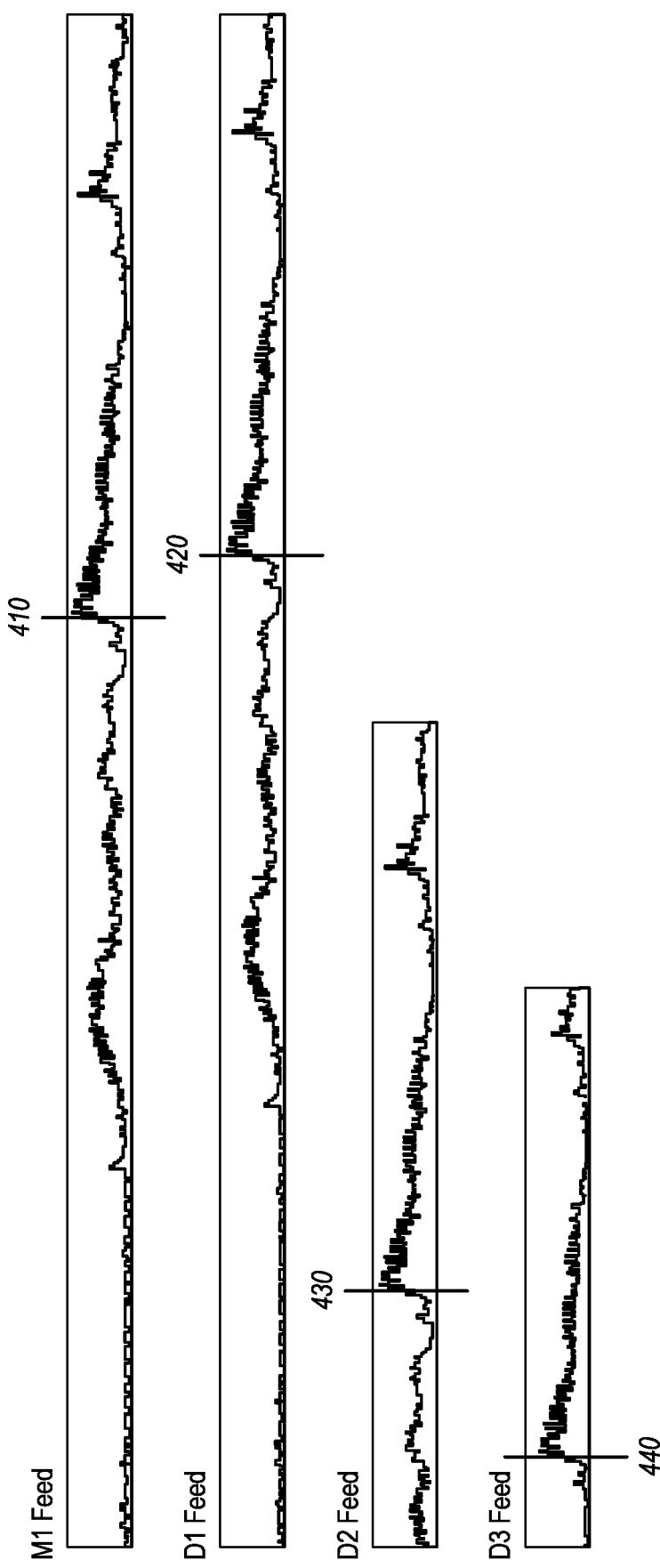
FIG. 4 illustrates another embodiment of the plurality of feeds associated with different recording devices.

FIG. 4 illustrates an alternative scenario, wherein the M1, D1, D2, and D3 Feeds are not all of similar duration. In particular, while the M1 and D1 Feeds shown in FIG. 4 are of similar duration, the duration of the D2 and D3 Feeds are not similar to the duration of any other feeds shown in FIG. 4. This can occur, for example, even where the recording devices M1, D1, D2, and D3 all capture the same event. For instance, a smartphone user operating D3 may have become aware of the event after it had already begun and thus began recording the event with the smartphone after the other devices had already begun to do so. This may occur more frequently in scenarios where, for example, the recording is made more ad hoc and/or with less expensive equipment and/or the recording start and end time is based on operator imitated reflexes.

In another instance, the D2 device (even when receiving a perfectly synchronized trigger to start the recording) may have been performing system updates or experiencing an error when the triggered start time began, and thus the D2 device may practically begin the recording of the event after M1 and D1, even if it was triggered to start at the same time. Thus, peak 410 of the M1 Feed, peak 420 of the D1 Feed, peak 430 of the D2 Feed, and peak 440 of the D3 Feed each represent the same real-world occurrence of the underlying event (e.g., a particular word spoken by subject 101 of FIG. 1), but each peak occurs after a different duration of time from the actual/triggered start time for the recording of each represented feed.

The embodiments disclosed herein can be used to help facilitate synchronizing of out-of-sync feeds, such as those represented in FIGS. 3 and 4, whether the feeds are similar in duration (e.g., as shown in FIG. 3) or not (as shown in FIG. 4). This is accomplished by automatically performing cross-correlations between two audio feeds and temporally offsetting the feeds in accordance with a temporal offset associated with a highest correlation value.

Once the audio feeds are synchronized, the other feeds/data associated with the audio feeds (e.g., video feeds, closed captioning, metadata/annotations) may be selected/mixed and automatically synchronized between the different device recordings by applying the same offset to the other feeds (or by virtue of the other feeds' association with a synchronized audio feed).

An initial step for synchronizing multiple out-of-sync audio feeds, in some instances, is to identify a base feed (which can be any first audio feed recorded from a first device for a particular recorded event) and a first feed (which can be any other audio feed recorded from a different device or that particular recorded event). The designation of a base feed can be useful for identifying a static feed for the purpose of performing cross-correlations (e.g., incrementally displacing/shifting one feed relative to the other and measuring similarity between the feeds).

Any criteria can be used for selecting the base feed and the first feed from a plurality of two or more different audio feeds that recorded a particular event. In some embodiments, the base feed is manually selected by a user. In other instances, the base feed is automatically selected by a system that obtains access to all of the different feeds.

For example, the user/system can select the base feed as one recorded by a standalone microphone which has superior audio recording specifications. In other embodiments, the base feed is selected randomly. In yet other embodiments, the base feed is selected based on one or more characteristics of the plurality of feeds provided to the system making the selection (e.g., feed duration). For instance, the base feed may be the audio feed selected from the plurality of different audio feeds which is determined to be a longest duration audio feed that recorded the particular event.

In other instances, the base feed is the feed selected from the plurality of feeds that is determined to be a highest quality/fidelity feed that recorded the particular event. In other instances, the base feed is the feed selected from the plurality of feeds that is associated with either a highest quantity or lowest quantity of additional content that is recorded into the same file/feed with and/or that is obtained from or recorded with a same device that recorded the audio feed (e.g., geolocation or other metadata tags, captioning content, video content, other content). In other instances, the base feed is the feed selected from the plurality of feeds that is determined to come from a recording device that is most responsive of a plurality of devices that recorded the event and such that it recorded the particular event with a shortest interval of time from a triggered start recording time to actual recorded audio content in the recorded audio feed(s). In other instances, the base feed is the feed selected from the plurality of feeds that is determined to have been recorded from a recording device in closest proximity to a particular audio source (e.g., a particular actor or other source) from the plurality of recording devices.

In the embodiments shown in FIGS. 5-11C, the M1 Feed has been selected as the base feed, although it will be appreciated that any other feed could serve as the base feed.

In some instances, the first feed is automatically or manually selected as being an audio feed associated with a desired video feed or other content that is recorded with a same device that recorded the first audio feed and that is to be synchronized with the audio of the first feed. Any of the criteria used to select the base feed can also be used to select the first feed, once the base feed is selected and from among the remaining feeds that remain after the base feed is selected, or (alternatively) prior to selecting the base feed from the feeds that remain after selecting the first feed.

Once the first feed is synchronized with the base feed, the corresponding/associated video/other content can then be synchronized with the base feed according to the synchronization that is determined to be applied to the first feed according to the disclosed methods and techniques described herein. Other feeds (e.g., second, third, fourth, etc.) can also be selected and synchronized to the base feed similarly to the disclosed techniques for synchronizing the first feed to the base feed.

It will be appreciated that the base feed and the first feed may only comprise limited portions of an entirely recorded event, such that the synchronizations that are applied can utilize different base/first feeds from different devices, at different portions of the recorded event, so as to dynamically accommodate different needs and preferences, as well as different conditions that may afflict/affect the various recordings/feeds.

Once the base feed and the first feed are identified, the first feed is temporally displaced/shifted relative to the base feed for the purpose of generating/identifying multiple similarity measures/values (at multiple displacements) between the base feed and the first feed.

Figure 5:
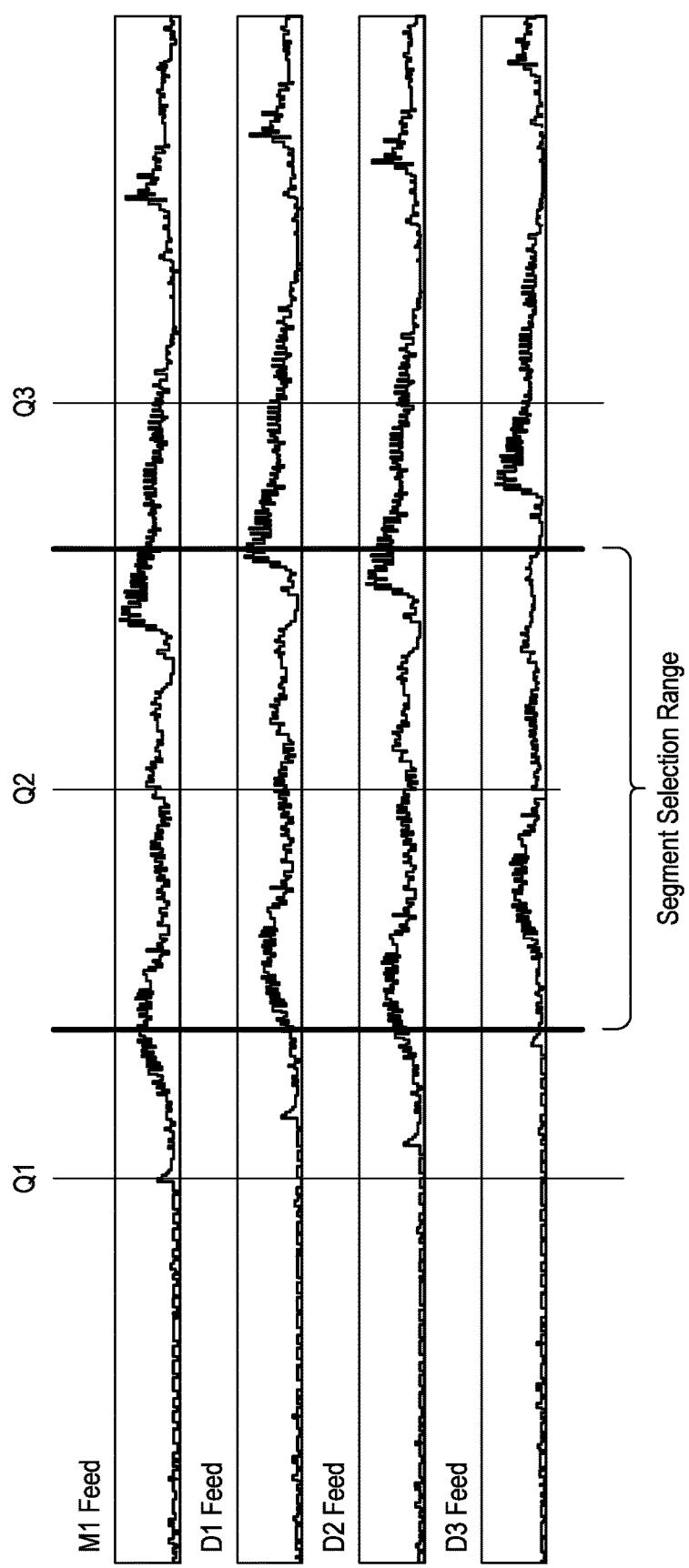
FIG. 5 illustrates a plurality of feeds associated with different recording devices and corresponding segment selection ranges for the different feeds.

Another step for synchronizing multiple audio feeds, in some instances, includes breaking up the base feed and the first feed into segments (e.g., a base segment of the base feed and a first segment of the first feed). FIG. 5 illustrates an exemplary segment selection range for the M1, D1, D2, and D3 Feeds. It should be noted that the M1, D1, D2, and D3 Feeds represented in FIG. 5 correspond to the Feeds shown in FIG. 3 (i.e., the Feeds are of similar duration).

In certain embodiments, particularly where the feeds to be synchronized are of similar duration and captured the same event, a system can make a segment selection such that subsequent cross-correlation calculations are performed only on/within the identified segment selection ranges, which can reduce system performance costs associated with performing cross-correlations on the entirety of the feeds. It will be appreciated that the segments identified can be of identical/similar duration. The segment ranges can be predetermined range durations and they may be automatically or manually set/applied to the different feeds based on similar features detected for the different feeds (e.g., known timestamps, relative durations from a start or end of the feed file or particularly wave feature (e.g., highest amplitude of the feed(s)), a central location of the feed(s), etc.).

In some instances, the durations of the segments are all restricted to have an identical duration. For instance, as shown in FIG. 5, the base feed (M1 Feed) is illustrated as having a same segment duration as each of the other feeds (D1, D2, and D3 Feeds). In other embodiments, the durations of the segments applied to or selected for the different feeds may vary in length/duration from one another.

In some instances, a user interface with selectable handles on the range (or range boundaries) are provided for a user to select and move to the desired range locations on a visualized feed. The selectable handles are not presently shown.

Also, as shown in FIG. 5, markers may be provided in a user interface that displays the different feeds being synchronized, or that are at least available to be synchronized and that are associated with a common recorded event, to indicate different quartiles of the feeds (i.e., Q1, Q2, Q3). The segment selection range represented for the various feeds in FIG. 5 are centered around Q2 (the median of the feeds). This segment selection, however, is non-limiting, and the segments selected can selected according to any convention. For example, an identified/selected segment can be centered around any other part of a feed (e.g., centered around Q1 or Q3) and/or can be selected according to a predefined offset from the beginning or the end of a feed. It will be recognized that the convention followed for identifying a segment for one feed need not be the same for each feed (e.g., the segment for the base M1 Feed can be centered around Q1, while the segment for a first D1 Feed can be identified by a predefined offset from the beginning of the D1 Feed).

Figure 6:
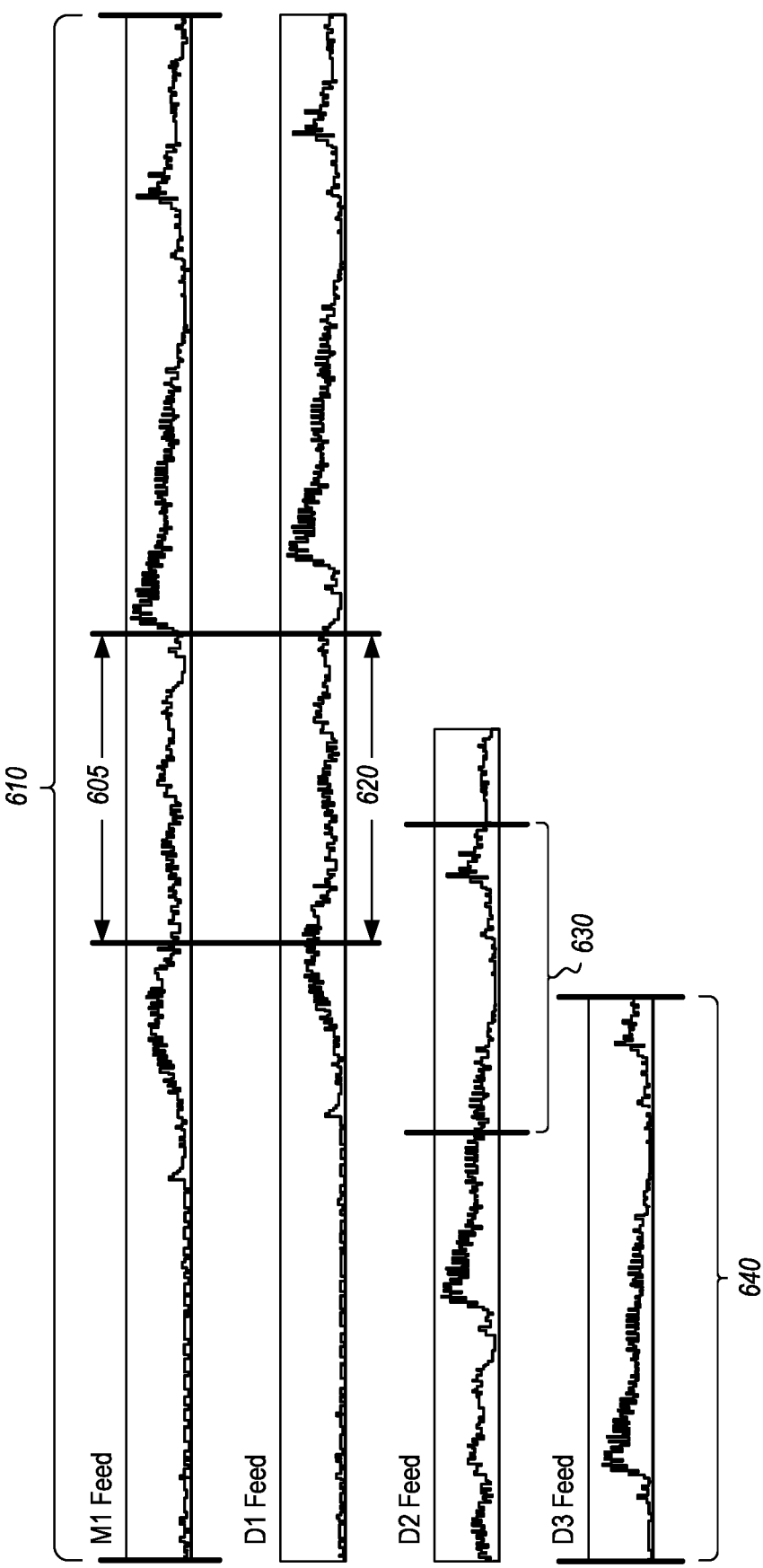
FIG. 6 illustrates another embodiment of the plurality of feeds associated with different recording devices and corresponding segment selection ranges for the different feeds.

The segment selection range for each of the feeds in FIG. 5 are of similar/identical duration and position for each of the feeds shown. In contrast, FIG. 6 illustrates various segment selection ranges for the M1, D1, D2, and D3 Feeds in an alternative instance where not all of the Feeds represented are of similar/identical position or duration. This can occur, for example, particularly where the feeds are not of similar duration (e.g., similar to the instance shown in FIG. 4).

As shown in FIG. 6, the M1 Feed has two segment selection ranges associated with it (i.e., segment selection range 605, 610). Both segment selection ranges 605 and 610 are centered around Q2, but the duration for segment selection range 605 is shorter than that of segment selection range 610 (which spans the entire M1 Feed). From this, it will be appreciated that multiple segments can be identified for a base feed (or any feed) such that one base feed segment can be used for performing cross-correlations with a segment of another feed (e.g., a first segment of a first feed) and a different base feed segment can be used for performing cross-correlations with a segment of a different feed (e.g., a second segment of a second feed).

For example, the segment 620 associated with the D1 Feed also aligns with segment selection range 605. As such, cross-correlations between the M1 Feed and the D1 Feed will be performed between the samples of the M1 Feed within the segment selection range 605 and the samples of the D1 Feed within the segment selection range 605. The segments associated with the D2 and the D3 Feeds, however, do not align with the segment selection range 605. Segment 630 of the D2 Feed is identified according to a predefined offset from the end of the feed, and segment 640 of the D3 Feed spans the entire feed. Thus, segment 610 of the M1 Feed can be utilized, rather than segment 605, for cross-correlations between the M1 Feed and segments of either of the D2 or D3 Feeds. In such instances, using a larger segment of the base feed can ensure that at least a portion of both of the segments of the feeds that are being synchronized and, currently, cross-correlated, will include samples corresponding to the same real-world occurrence (e.g., a same portion of the event shown in FIG. 1), which makes finding an optimal temporal offset for synchronizing the feeds possible, as will be discussed in more detail below.

Notwithstanding the foregoing example, it will be appreciated that a segment of a feed (e.g., M1 Feed), which is being used for cross-correlating with a feed having a substantially different duration (e.g., the D2 or D3 Feeds), need not span the entire M1 Feed (as segment currently 610 does).

In some instances, the various feeds include metadata which indicate a real-world start time for each feed (at least a best-known world start time currently known to the recording device, or a device specific world start time, and which may be slightly different than a similar world start time for a different feed/device, but which may be similar). For example, metadata associated with the D2 Feed may indicate that the D2 Feed began recording at 11:35:18 EST, while metadata associated with the M1 Feed may indicate that the M1 Feed began recording at 11:35:02 EST. A system can then utilize the identified disparity in the real-world start times to identify a segment of the base feed (e.g., the M1 Feed) to use for cross-correlations based on these device-specific world start times (e.g., a base segment that is offset from the beginning of the M1 Feed by 15 seconds), which can have a lower performance cost than utilizing the entire base feed to perform cross-correlations. In such instances, segment of the D2 Feed can also be identified such that less than the entire D2 Feed is used in performing cross-correlations (e.g., a segment starting at the beginning of the D2 Feed but smaller in duration than the whole D2 Feed). It will be appreciated, however, that even when selecting segments as having the same real-world start times from different devices, those start times are not necessarily going to be identical/synchronized to the world atomic clock or even each other, due to differences in processor clock cycles, operator errors in setting the times, time synchronization errors in the system clocks, and other variations/variables in the different systems. That said, however, the estimated/known device-specific real-world times (even if slightly offset from each other) can be an initial coarse time basis for selecting the initial segments of the different feeds.

Aside from metadata, it should be noted that, in some embodiments, a system can prompt a user to provide user input on a user interface that will assist in determining an appropriate segment for a base feed or another feed. For example, a user could enter input corresponding to an estimate of the real-world start time disparity between two recording devices (e.g., that D2 began recording 15 seconds after M1). Using this estimate, the system then identifies a base segment of a base feed and a first segment of a first feed which can save performance costs.

It should also be noted that the duration of the segments (either a base segment or another segment) can be predefined according to any convention such as a predefined duration value (e.g., 4 seconds long, 8 seconds long, or any other duration), a predefined ratio based on the duration of the underlying feed (e.g., 1/4 as long as the feed, 1/8 as long, or any other ratio) or dynamically calculated based on metadata associated with the underlying feed (e.g., based on a disparity in real-world start times). Those skilled in the art will appreciate that different conventions can be used for defining the duration of different segments, and that different segments can have different durations.

After identifying a base feed and a first feed and identifying a base segment of the base feed and a first segment of the first feed (if desired), another step for synchronizing multiple audio feeds may include performing a cross-correlation between the base segment and the first segment (or the base feed and the first feed when the entire base/first feed are being used rather than discrete segments of the feeds).

Performing a cross-correlation between two datasets, in some instances, includes calculating a similarity between the two datasets as a function of a temporal displacement/shift/offset between the two datasets. As such, performing a cross-correlation includes steps of temporally displacing/shifting/offsetting one dataset with respect to the other, and steps of calculating the similarity (a relative similarity or correlation value) corresponding to the two datasets at each temporally displaced/shift/offset step or value. When applied to a plurality of different temporal offset values between the different feeds/segments, a plurality of correlation values is generated, each corresponding to a different displacement/shift/offset value that was applied to the shifted dataset.

In some instances, the first feed is time-shifted with respect to the base feed, when performing a cross-correlation. The size of the temporal shift between the feeds/segments can be viewed as and determined according to a granularity parameter. The granularity parameter can be thought of as a step size, being embodied as a quantity of samples (e.g., 4, 8, 16, 32, 64, or any number of samples) or a duration of time (e.g., in the range of 0.08 ms to 16 ms).

In some instances, a different, unique multiple of the granularity parameter (e.g., 1× granularity parameter, 2× granularity parameter, 3× granularity parameter, etc.) is used to shift one of the feeds/segments with respect to the other feed/segment to determine each of the plurality of correlation values (similarity measures) between the feeds for the different temporal offsets within the selected range(s), until all multiples of the granularity of the parameter are exhausted for temporally shifting the feeds/segments relative to each other at the predetermined granularity within the selected range(s).

The granularity parameter, in some embodiments, is predefined by a user or dynamically calculated based on characteristics of the feeds involved in the cross-correlation calculations (e.g., quantity of audio segments (e.g., 1, 2, 3, 4, 4+ segments), duration of time (e.g., 1, 2, 3, 4, 4+ micro/milli-seconds), percentage of the segment to the segment range (e.g., 1%, 2%, 3%, 4%, 4+%) or any other predetermined granularity parameter.). These temporal offsets/shifts of the segments/feeds may be based on any desired magnitude of the feeds.

In some instances, each audio feed/segment corresponds to audio/audio samples that are recorded over time. Even more particularly, for example, the audio samples can correspond to a sampling frequency, such as 8,000, 16,000, 32,000, 44,100, or 48,000 samples per second. The granularity parameter and corresponding temporal displacement/shift/offset between the different audio feeds/segments may be, therefore, a temporal or time shift in a specified quantity of these samples.

In some instances, it is computationally expensive and unnecessary to shift the first segment with respect to the base segment by increments of only one sample (or the equivalent time interval) for each similarity calculation between the segments. Thus, in some embodiments, a granularity parameter used to define the size of the time shift will be a granularity of greater than one sample or, in some instances, greater than 2, 3, 4 or more samples (or their equivalent time intervals).

Different algorithms and schemes can be used for determining the relative cross-correlation similarity values between the different feeds/segments, as they are temporally shifted relative to each other (one for each time shift). For example, the similarity/correlation value can be determined by calculating a correlation coefficient, such as a basic correlation coefficient corresponding to $$r_{x,y} = \sum_{i=1}^{n} (x_i - x)(y_i - y)$$

or a Pearson correlation coefficient corresponding to $$r_{x,y} = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

where x is the base segment (or feed) and y is the first segment (or feed), or vice versa. It will be appreciated, however, that the similarity between the feeds may be determined in other ways, such as by calculating a quotient or other product-moment or bivariate correlation coefficient.

It should further be noted that not every sample value within the segments needs to be utilized/considered when calculating a correlation value. Thus, another granularity parameter (which can be the same as or different from the step size granularity parameter referenced above) is utilized, in some embodiments, to reduce the number of samples used in the correlation value calculation. For example, a correlation coefficient could be determined based on every $4^{th}$ sample, $8^{th}$ sample, $16^{th}$ sample, $32^{nd}$ sample, $64^{th}$ sample, or any ordinal number of samples, which can save on performance costs.

In some instances, the time-shifting engine 210 described in FIG. 2 performs the displacing/shifting/offsetting steps described above, and the correlation engine 212 described in FIG. 2 calculates the similarity between the two segments (or feeds) for each unique time shift to generate a plurality of correlation values.

Figure 7B:
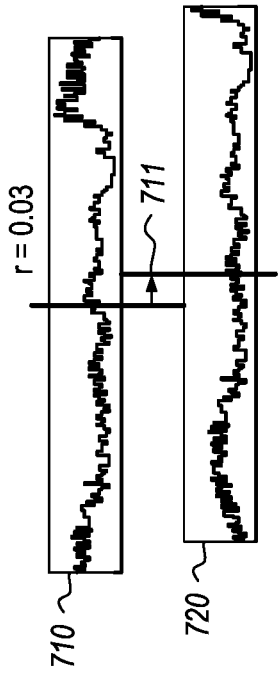
FIGS. 7A-7F illustrate offsets and correlations associated with various segments obtained from different feeds associated with different recording devices.
Figure 7D:
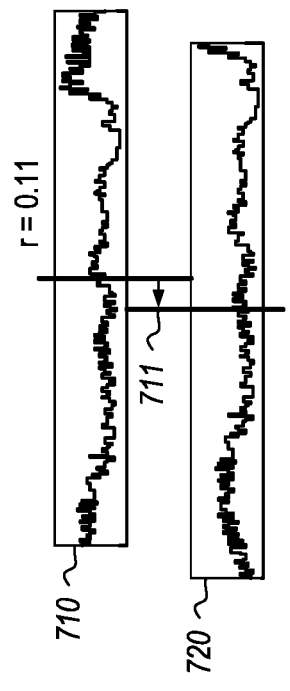
Figure 7F:
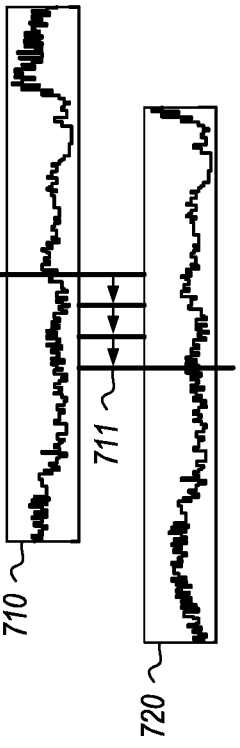
Figure 7A:
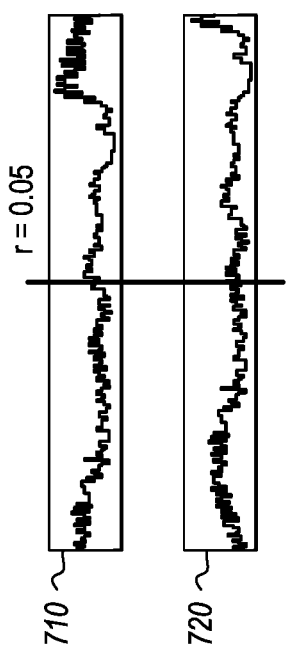

To further illustrate these principles, FIGS. 7A-7F conceptually depicts a cross-correlation being performed between segments of audio feeds. In the illustrated embodiment, FIG. 7A shows base segment 710, which is associated with the M1 Feed (or base audio feed), and first segment 720, which is associated with the D1 Feed (or first audio feed). Although FIGS. 7A-7F focus on an embodiment wherein a cross-correlation is performed between segments of the M1 Feed and the D1 Feed, it will be appreciated that the principles illustrated herein can be applied as between any two audio feeds.

FIG. 7A illustrate time shifts performed and correlations calculated between base segment 710 and first segment 720. In FIG. 7A, no time shift is applied to the first segment 720 with respect to the second segment (e.g., put differently, the unique multiplier of a granularity parameter applied to time-shift first segment 720 is zero). A similarity is then measured between the two segments. As noted above, a Pearson correlation coefficient can be calculated between the audio samples of the base segment 710 and the audio samples of the first segment 720 to assess the similarity between the two segments at any particular time shift of any granularity parameter (e.g., a 0×, 1×, 2×, 3×, 4×, or 4×+ granularity parameter shift). As illustrated in FIG. 7A, with a zero-time-shift applied to the two selected segments, the calculated Pearson correlation coefficient is r=0.05.

FIG. 7B illustrates a non-zero time shift 711 applied to first segment 720 relative to a base segment 710. In this instance, the unique multiple of the granularity parameter in FIG. 7B is one. As such, a time shift 711 equivalent to the granularity parameter (1x the granularity parameter, comprising a temporal offset by the magnitude of the granularity parameter) is applied to first segment 720. In the illustrated example, the granularity parameter of 16 samples is utilized. Thus, the first segment 720 is temporally offset from the base segment 710 by 16 sample steps. The Pearson correlation coefficient calculated between the base segment 710 and the shifted first segment 720 with this temporal offset is determined to be r=0.03.

Figure 7C:
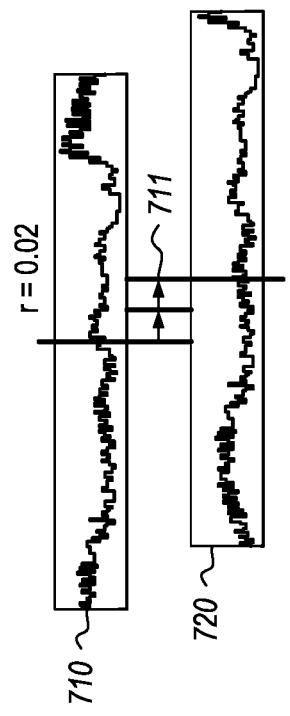

FIG. 7C shows another non-zero time shift 711 applied to first segment 720. Here, the unique multiplier used is two, so the time shift applied to first segment 720 (with respect to the original time values) is 32 sample steps (two times the granularity parameter). The Pearson correlation coefficient between the base segment 710 and the shifted first segment 720 in this instance is calculated to be r=0.02.

The system may continue to temporally offset the first segment 720 in the positive direction (e.g., the shift direction depicted in FIGS. 7B-7C) by shifting the first segment 720 by incrementally and iteratively increasing the offset between the feeds/segments by what is, in essence, a unique multiple of the granularity parameter at each different offset, to determine, a plurality of time-shifted first segments 720 relative to the base segment 710.

The system also calculates a relative correlation coefficient for each of the plurality of time-shifted first segments 720, with respect to the base segment 710, whether using the Pearson correlation or any other correlation calculation algorithm. The system may continue to time shift the first segment 720 and calculate the relative correlation coefficients until there is no overlap between the samples base segment 710 and first segment 720, or until the number of overlapping samples upon which to perform a correlation calculation becomes lower than a predetermined threshold.

In some instances, the processes of temporally offsetting the feeds/segments and the calculation of the correlation coefficients continues (with or without spanning the entire overlapping segment ranges), additionally or alternatively, until the correlation coefficients reach a predetermined threshold correlation valuation and/or until the relative correlation coefficients stop showing any improvements for a predetermined quantity of temporal offsets (e.g., 2, 3, 4, 5, 6, 7, 8, 9, 10, 10+ offsets), for example.

Figure 7E:
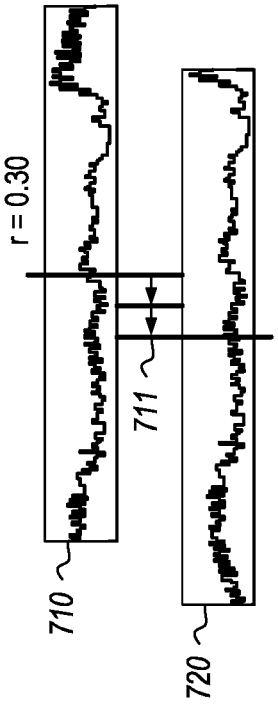

FIGS. 7D-7F show non-zero time shifts 711 being applied to first segment 720 in an opposite direction from what was previously described, along with the valuation of the calculated correlation between base segment 710 and first segment 720 for each of the time shifts. Accordingly, as can be seen from this example, the temporal offsetting of a feed relative to the base feed may be any magnitude of the granularity parameter (even a negative value, such as −1×, −2×, −3×, and/or <−3× the granularity parameter, and which can move the feed/segment in an opposite direction from a positive granularity parameter offset).

For example, in FIG. 7D, the unique multiple of the granularity parameter is negative one (a time shift 711 of −16 samples) and the resulting correlation coefficient is r=0.11, in FIG. 7E, the unique multiple of the granularity parameter is negative two (a time shift 711 of −32 samples) and the resulting correlation coefficient is r=0.30, and in FIG. 7F, the unique multiple of the granularity parameter is negative three (a time shift 711 of −48 samples) and the resulting correlation coefficient is r=0.13. Similarly, the system may continue to temporally offset the first segment in the negative direction (e.g., the shift direction depicted in FIGS. 7D-7F) and calculate a correlation coefficient for each temporal offset until there is no overlap between the samples base segment 710 and first segment 720, or until the number of overlapping samples upon which to perform a correlation calculation becomes lower than a predetermined threshold, for example.

According to FIGS. 7A-7F, the system performs a cross-correlation between base segment 710 and first segment 720 and generates a plurality of correlation values. In some embodiments, the system identifies a particular time shift (or time-shifted first segment) that is associated with a highest correlation value of the plurality of correlation values. Based on the time shift with a highest correlation value, the system can determine an offset value or temporal offset (e.g., from the unique multiple and granularity parameter used in the time-shifted first segment associated with the highest correlation) and synchronize the first feed with respect to the second feed based on the offset value or temporal offset (e.g., by temporally shifting the first feed by the offset value or temporal offset).

In the embodiments shown, the offset value or temporal offset associated with the highest correlation value is the time shift shown in FIG. 7E (with a unique multiple of the granularity parameter of negative two, resulting in a temporal shift of −32 sample steps and a correlation coefficient of r=0.30). Thus, in some embodiments, the system offsets the D1 Feed by −32 sample steps to synchronize the D1 Feed with the M1 Feed, allowing the various feeds to be easily edited and/or combined to generate time-synchronized content.

In some embodiments, the system further refines/modifies the offset value or temporal offset by performing additional cross-correlations between the base segment and the first segment with a refined granularity parameter that is within the bounds of the previously determined offset value or temporal offset. In such instances, the new/refined granularity parameter is a value/magnitude less than the first granularity parameter.

Figure 8A:
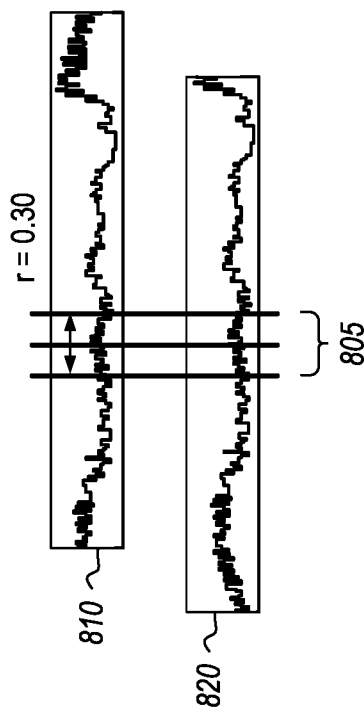
FIGS. 8A-8C illustrate other embodiments of offsets and correlations associated with various segments obtained from different feeds associated with different recording devices.
Figure 8C:
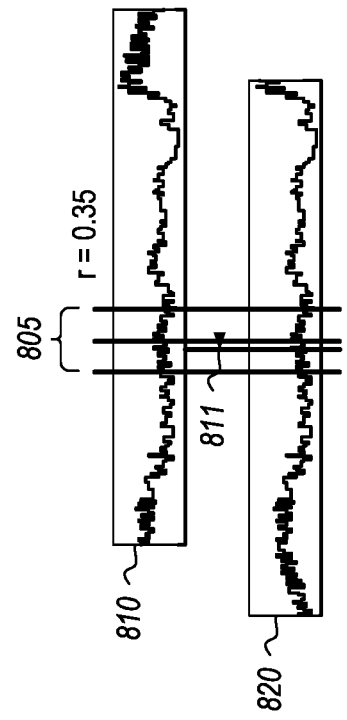
Figure 8B:
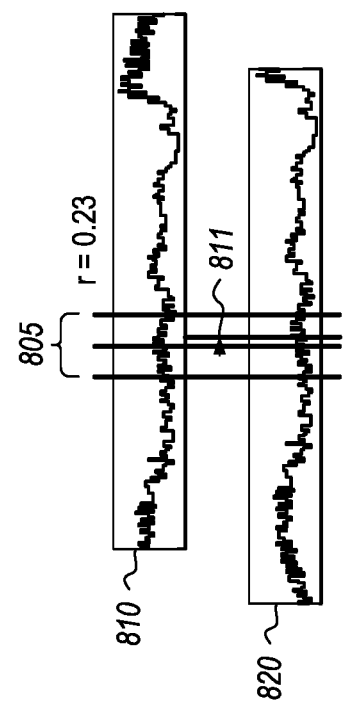

This refining step is conceptually depicted in FIGS. 8A-8C. As shown in FIG. 8A, first segment 820 (which corresponds to first segment 720 of FIGS. 7A-7F) is already temporally offset with respect to base segment 810 (which corresponds to base segment 710 of FIGS. 7A-7F) by an amount that corresponds to the offset value or temporal offset that was determined to be associated with a highest correlation value in a previous cross-correlation analysis (e.g., by −32 samples, as shown in FIGS. 7A-7F).

As is further shown in FIG. 8C, a refined cross-correlation range 805 identifies the range in which subsequent refining cross-correlations will be performed to generate a plurality of refined correlation values. In the illustrated embodiment, the size of the refined cross-correlation range 805 is based on the first granularity parameter used in reference to FIGS. 7B-7F. In particular, the refined cross-correlation range 805 is centered around the median of first segment 820 (after it has been offset based on the previously determined temporal offset) and includes a range of samples that is twice as large as the first granularity parameter described above (e.g., a total range of 64 samples).

Within the refined cross-correlation range 805, the system will perform refined cross-correlation calculations to determine a plurality of refined correlation values. From the plurality of refined correlation values, the system can identify a refined offset value or refined temporal offset associated with the highest refined correlation value and can synchronize the first feed to the base feed based on the refined correlation value.

Accordingly, FIG. 8B shows a non-zero time shift 811 applied to first segment 820. In the illustrated examples, a refined granularity parameter of 4 sample steps is used, which is smaller than the granularity parameter utilized above to determine the first offset value/temporal offset. The unique multiple of the refined granularity parameter is one, and so the samples of the first segment 820 are temporally offset from their previous times by 4 sample steps. A refined correlation value is calculated, which is r=0.23.

Similarly, FIG. 8C shows another non-zero time shift 811 applied to first segment 820. The unique multiple of the refined granularity parameter is negative one, and so the samples of the first segment 820 are temporally offset from their previous times by −4 sample steps. The calculated refined correlation value is r=0.35. Although not explicitly shown in FIGS. 8A-8C, it will be recognized that the system may continue to temporally offset the first segment 820 in both directions by shifting the first segment 820 by increasing unique multiples of the refined granularity parameter to determine, in essence, a plurality of refined first segments 820. The system also calculates a refined correlation value for each of the plurality of refined first segments 820 with respect to the base segment 810. The system may continue to time shift the first segment 820 and calculate refined correlation coefficients until all refined correlation values within the refined cross-correlation range are calculated (according to the refined granularity parameter).

Figure 9:
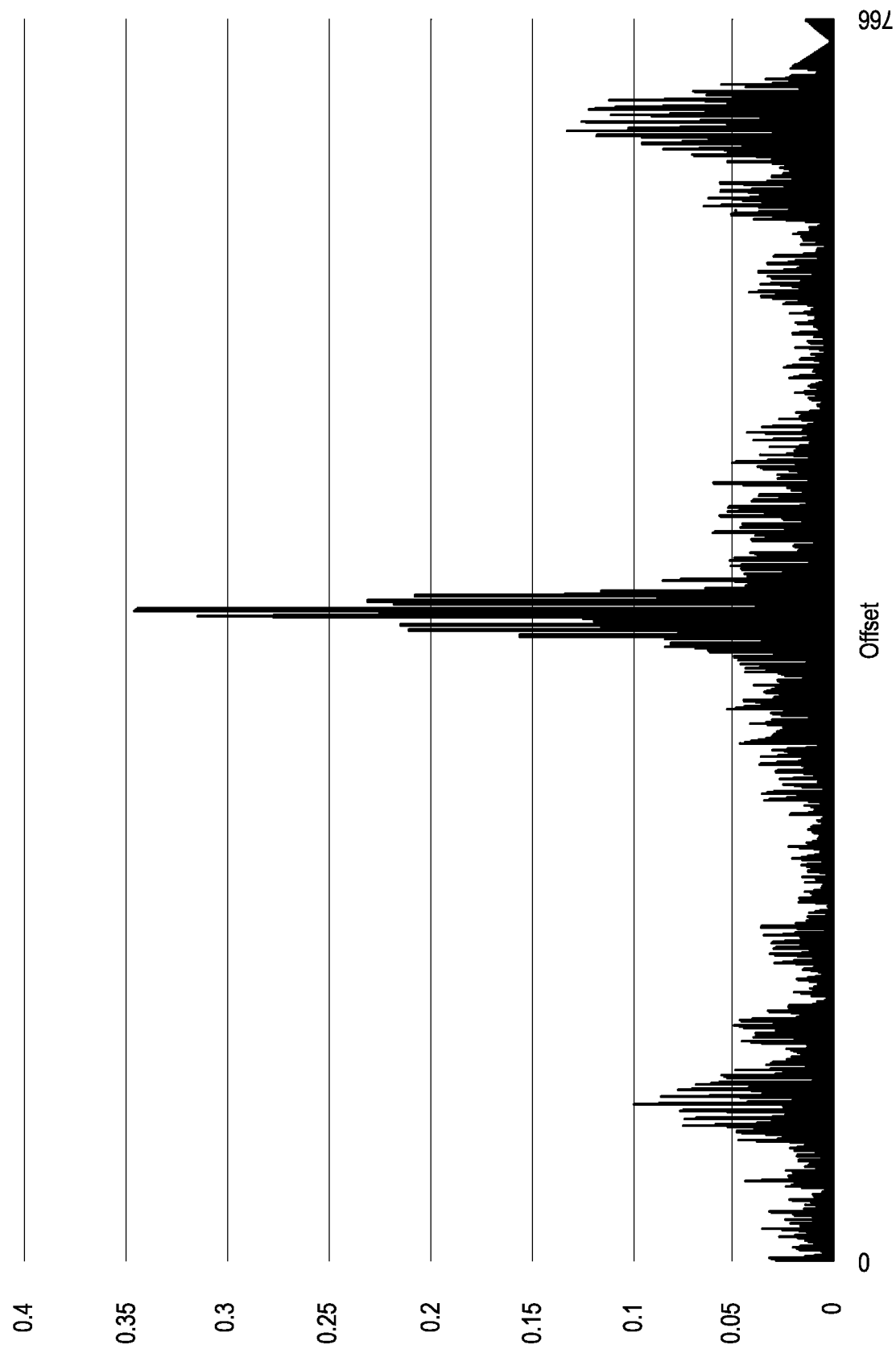
FIG. 9 illustrates a graph depicting correlation coefficients for different offsets of different feeds from different recording devices.

FIG. 9 shows a graph based on the above-noted concepts of a plurality of refined correlation values being calculated for a plurality of refined first segments (each having been time shifted according to a unique multiple of a refined granularity parameter). In particular, the graph shows the plurality of refined correlation values associated with each refined offset value/temporal offset of the refined first segments. The horizontal axis indicates the size of the offset (the number of sample steps), and the vertical axis indicates the correlation value for each. By comparing the refined correlation values with each other, the system identifies a particular offset value corresponding to the particular refined first segment (time-shifted) having the highest correlation value.

It will be appreciated that a graph similar to the graph depicted in FIG. 9 can be generated based on the time shifts and correlation calculations shown, for example, in FIGS. 7A-7F, wherein a different granularity parameter was utilized.

A graph similar to that shown in FIG. 9 can be displayed to a user to reflect the magnitudes of the correlations values that result from the different time shifts so that a user can determine whether, for example, a refining synchronization process should be applied with new/refined granularity parameters. In some instances, the refined granularity parameters can generate more dynamic variations between the relative correlations and can enhance the fidelity of the synchronization. However, the application/processing of the refined granularity parameters for determining additional temporal offsets and correlation valuations can be computationally expensive and may not be warranted when the previous synchronization processes with the coarser granularity parameter can adequately identify the appropriate offset to provide a desired fidelity of synchronization.

After identifying the offset value/temporal offset corresponding with the highest correlation value, and/or the highest refined correlation value (if refined cross-correlations were performed), the system synchronizes the first feed with the base feed. In some instances, the synchronization step is performed by the synchronization engine 214 described hereinabove with reference to FIG. 2.

Figure 10:
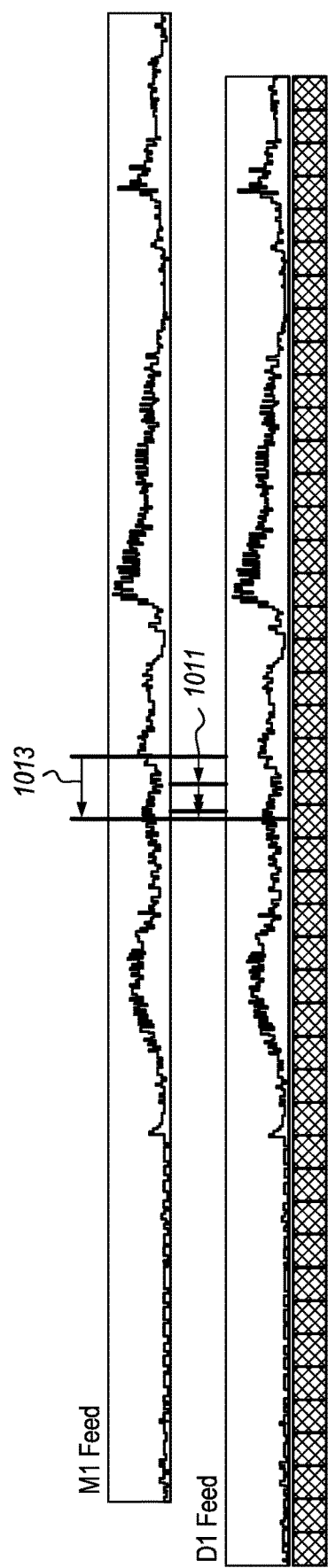
FIG. 10 illustrates a synchronization of two feeds obtained from different recording devices.

FIG. 10 illustrates a synchronization of the M1 Feed, or base feed, and the D1 Feed, or first feed (recall that the calculations exemplarily depicted in FIGS. 7A-8C were performed on segments of the M1 Feed and the D1 Feed). As is illustrated, a temporal offset 1013 is applied to shift the D1 Feed with respect to the M1 Feed, such that the two feeds become temporally aligned (e.g., the waveforms representing the audio samples of the feeds have aligned characteristics). The temporal offset 1013, in some embodiments, is based on the offset value associated with the time-shifted first segment having the highest correlation value and/or the refined offset value associated with the refined first segment having the highest refined correlation value. Notice that the size of temporal offset 1013 corresponds to the size of time shift 1011, and that time shift 1011 is based on the time shifts calculated in FIGS. 7E and 8C which, when combined, yielded the highest refined correlation value (r=0.35).

It should also be noted that the video feed associated with the D1 Feed is also temporally offset so as to be temporally aligned with the M1 Feed. Accordingly, because both feeds are aligned, a user may easily edit and/or combine different aspects of the various feeds to generate time-synchronized content. For example, in some instances, the sound recording hardware of M1 (a standalone microphone) is superior to the sound recording hardware of D1 (a camcorder), or, during recording, M1 is situated in an optimal sound capturing location (e.g., close to subject 101), whereas D1 is not. In one instance, after the feeds are synchronized according to the steps described herein, the user combines the video feed of the D1 Feed with the audio feed of the M1 Feed to create time-synchronized content. The user can make this combination easily, without needing to manually temporally offset the feeds since the feeds are already time-synchronized.

It will be appreciated that other data associated with an audio feed (e.g., closed captioning, metadata/annotations) may similarly be synchronized according to the determined temporal offset.

Although FIG. 10 only show two feeds being temporally offset into a state of improved alignment (e.g., the M1 Feed and the D1 Feed or the M1 Feed and the D3 Feed), it will be appreciated that the processes described hereinabove can, in some instances, be applied to more than two feeds, to synchronize all of the applied feeds. For example, after (or simultaneously with) synchronizing the M1 Feed with the D1 Feed, synchronization steps may be applied/performed to the M1 Feed relative to the D3 Feed (as will be discussed with respect to FIGS. 11A-11C).

Furthermore, although FIGS. 7A-8C focused on performing cross-correlations between datasets (audio feeds) by aligning the centers of the feeds and calculating time shifts from a center axis of the datasets, those skilled in the art will recognize that this depiction is exemplary only, and other implementations are within the scope of this disclosure. For example, FIG. 11A shows a cross-correlation being performed between base segment 1110 (which corresponds to segment 610 of FIG. 6) and first segment 1140 (which corresponds to segment 640 of FIG. 6) by aligning the corresponding leftmost data points (e.g., at time zero) of the datasets and applying time shifts with respect to a leftmost axis.

Figure 11A:
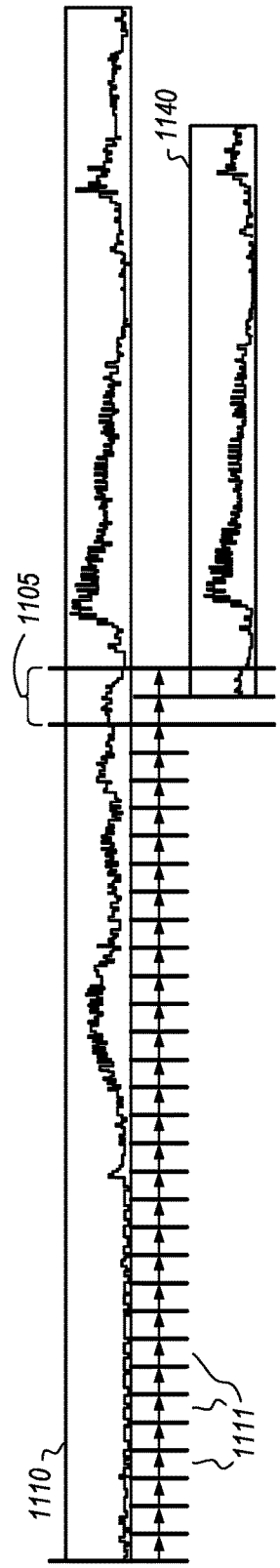
FIGS. 11A-11C illustrates embodiments of offsets and synchronization of different feeds.
Figure 11B:
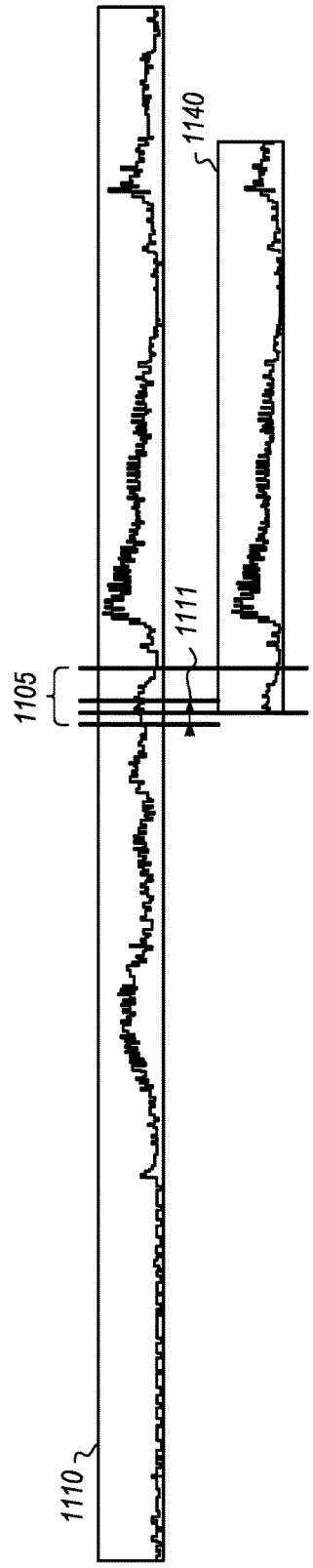
Figure 11C:
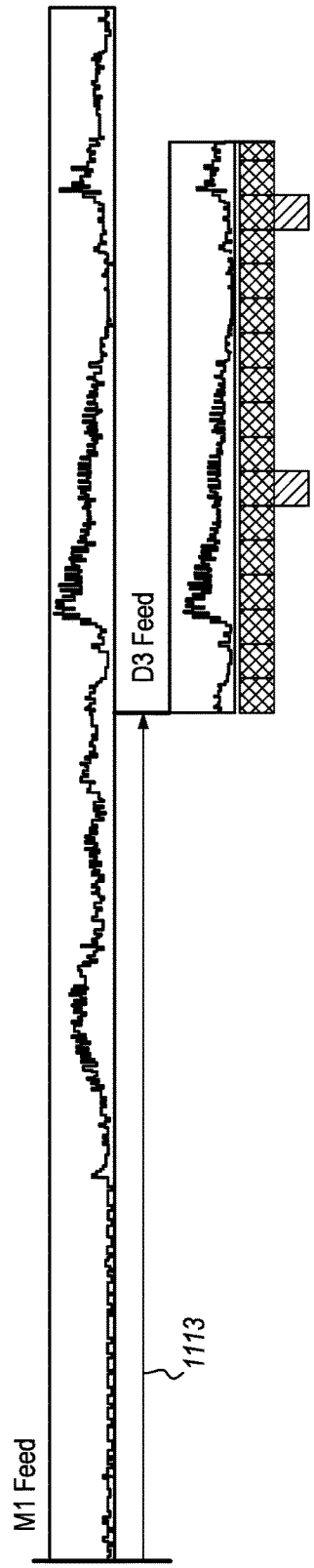

FIGS. 11A-11C also illustrate that the principles described herein do not require the segments selected from the audio feeds to be the same duration.

In particular, FIG. 11A conceptually shows time-shifted first segment 1140, wherein time-shifted first segment 1140 is one of a plurality of time-shifted first segments (only one of the plurality is shown). As noted above, the time shifts are applied to the first segment after the first segment and the base segment have been temporally aligned by their leftmost sample (e.g., at time zero), and the time shifts are applied as shifts from an aligned leftmost axis. Each time-shifted first segment of the plurality of time-shifted first segments has a time shift (or temporal offset or offset value) corresponding to a unique multiple of a granularity parameter (e.g., 16 samples) applied to it. Each time shift 1111 illustrated corresponds to a time shift for a different time-shifted first segment 1140 of the plurality of time-shifted first segments.

A correlation value is determined between the base segment 1110 and each time-shifted first segment. The time-shifted first segment 1140 illustrated in FIG. 11A is associated with the highest correlation value of the plurality of time-shifted first segments. In some embodiments, the system applies time shifts to the first segment 1140 with increasing multiples of the granularity parameter until the samples of the base segment 1110 and the samples of the first segment no longer entirely overlap.

FIG. 11B conceptually illustrates a system performing refined cross-correlation calculations. A refined cross-correlation range 1105 is identified based on the previously calculated time shift/temporal offset associated with the highest correlation value (e.g., shown in FIG. 11A). As shown, the refined cross-correlation range 1105 is centered at a location that is displaced from the leftmost axis by an amount that corresponds to the previously calculated time shift/temporal offset associated with the highest correlation value. Put differently, the refined cross-correlation range 1105 begins at a location that is displaced from the leftmost axis by an amount that corresponds to the previously calculated time shift/temporal offset associated with the highest correlation value. The refined cross-correlation range 1105 has a range of two time the previously used granularity parameter (e.g., a range of 32 samples).

Furthermore, FIG. 11B conceptually shows refined first segment 1140, wherein refined first segment 1140 is one of a plurality of refined first segments (only one of the plurality is shown). Each refined first segment of the plurality of refined first segments has a refined time shift 1111 corresponding to a unique multiple of a refined granularity parameter (e.g., 4 samples) applied to it. Each refined time shift 1111 illustrated corresponds to a time shift for a different refined first segment 1140 of the plurality of refined first segments. The refined time shifts are performed within the refined cross-correlation range 1105.

A refined correlation value is determined between the base segment 1110 and each refined first segment. The refined first segment 1140 illustrated in FIG. 11B is associated with the highest refined correlation value of the plurality of refined first segments. In some embodiments, the system applies refined time shifts 1111 to the first segment 1140 with increasing multiples of the refined granularity parameter until the end of the refined cross-correlation range 1105 is reached.

FIG. 11C shows a synchronization of the M1 Feed, or base feed, and the D3 Feed, or first feed. A temporal offset 1113 is applied to shift the D3 Feed with respect to the M1 Feed, such that the two feeds become temporally aligned. The temporal offset 1113 is based on the offset value associated with the time-shifted first segment having the highest correlation value and the refined offset value associated with the refined first segment having the highest refined correlation value. It should also be noted that the video feed and the metadata/annotations associated with the D3 Feed are also offset by temporal offset 1113 and thus synchronized with the other feeds. (See the texturing legend in FIG. 3, for example, describing Feed D1 as containing or being associated with supplemental video content recorded with and/or that is already temporally synchronized with the D1 Feed audio content, and Feed D2 as containing or being associated with supplemental video and captioning content recorded/generated with and/or that is already temporally synchronized with the D2 Feed audio content, and Feed D3 as containing or being associated with supplemental video and metadata recorded/generated with and/or that is already temporally synchronized with the D3 Feed audio content, for example).

Thus, in some embodiments, by performing the processes conceptualized in FIGS. 7A-8C and FIGS. 11A-11C, the M1 Feed becomes synchronized with both the D1 Feed and the D3 Feed. When multiple feeds are audio-synchronized according to the disclosed embodiments, a content producer is enabled to easily identify different feeds to be synchronized and then to edit and/or combine the different content/portions of the various feeds, after they are automatically synchronized (via the disclosed embodiments), to create mixed and synchronized content, without the tedium of manually audio-synchronizing the separate feeds. For example, a content producer could combine the video feed of the D1 Feed with the audio feed of the M1 Feed for a first portion of the underlying event, and then transition to a combination of the video and annotations of the D3 Feed with the audio feed of the M1 Feed for the remainder of the event. It will be appreciated that the principles described herein can be performed on any number of feeds obtained from any number of recording devices to create diverse content (e.g., time-synchronized content featuring multiple camera angles and active microphones).

In some embodiments, not shown, the system interfaces enable a user/content producer to identify a plurality of feeds and the content from each feed that they want to mix. The system then automatically synchronizes the different feeds that are identified and then extracts the different selected content/portions from each of the synchronized feeds and mixes that content into a synchronized and final mixed product that is saved and provided to the user/producer for rendering and which omits portions/content that was not identified/selected and without requiring the user/producer to synchronize the mixed/selected portions.

Many of the foregoing examples reference audio feeds that comprise a single audio track/feed that may sometimes be recorded with other content (e.g., D2 being recorded with video content and/or captioning and D3 being recorded with video content and metadata). These examples reference how this additional content can be synchronized and mixed with a base audio feed after synchronizing the associated audio feeds. It will be appreciated, however, that the scope of this disclosure is not limited to such embodiments and can also include, for example, situations in which the associated content is another audio track/feed that was recorded by a same particular system that recorded the particular feed that was temporally offset into synchronization with the base feed. For example, the D2 Feed could comprise a plurality of audio sub-feeds/sub-tracks that are synchronized together into the D2 Feed from the original D2 recording, each corresponding to a different instrument/audio source and a correspondingly different audio signature/microphone that the recording system utilized to identify and record the different sub-feeds/sub-tracks as part of the D2 Feed.

In such embodiments, one of the D2 Feed sub-feeds/sub-tracks can be synchronized with the base feed (e.g., M1 Feed) and then one or more of the other sub-feeds/sub-tracks can be extracted from the D2 Feed and applied/synchronized/mixed to the audio of the base feed as though it were other non-audio supplemental content (e.g., video, captioning, metadata content). In this manner, it is possible to synchronize a base audio feed with any additional audio feed(s) for the same event and to subsequently identify and extract and synchronize/mix the supplemental content associated with the additional audio feed(s) to the base audio feed, whether that supplemental content is video, captioning, metadata, other audio sub-feeds/sub-tracks, and/or any other supplemental content.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
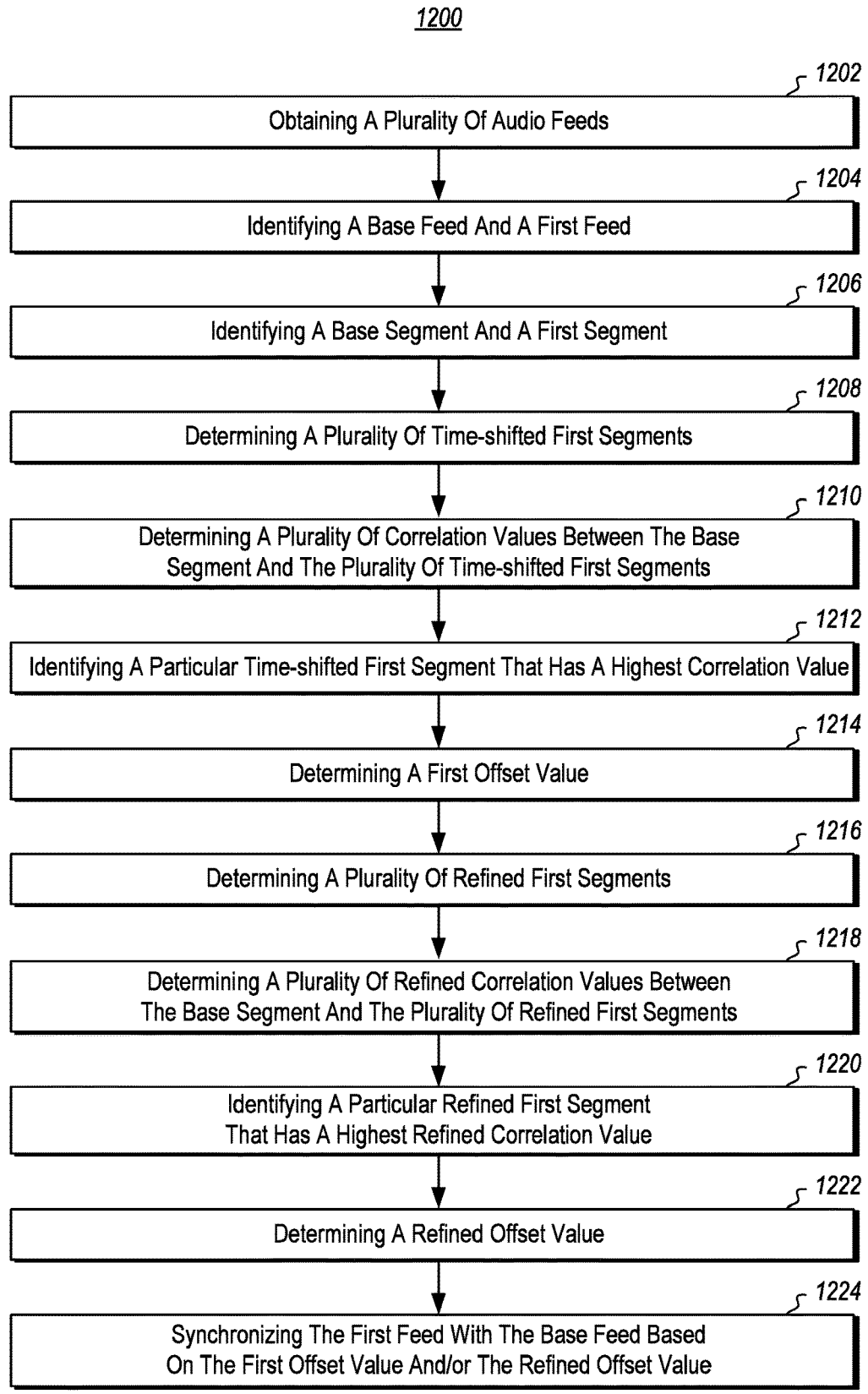
FIG. 12 illustrates an exemplary flow diagram depicting a method for synchronizing multiple audio feeds.

FIG. 12 illustrates a flow diagram 1200 depicting acts associated with various methods for facilitating the synchronizing of multiple audio feeds and, in some instances, their associated content, as described throughout this disclosure. In particular, the illustrated flow diagram 1200 includes acts of obtaining a plurality of audio feeds (1202), identifying a base feed and a first feed (1204), identifying a base segment and a first segment (1206), determining a plurality of time-shifted first segments (1208), determining a plurality of correlation values between the base segment and the plurality of time-shifted first segments (1210), identifying a particular time-shifted first segment that has a highest correlation value (1212), determining a first offset value (1214), determining a plurality of refined first segments (1216), determining a plurality of refined correlation values between the base segment and the plurality of refined first segments (1218), identifying a particular refined first segment that has a highest refined correlation value (1220), determining a refined offset value (1222), and synchronizing the first feed with the base feed based on the first offset value and/or the refined offset value (1224).

As noted above, act 1202 includes obtaining a plurality of audio feeds. In some embodiments, the audio feeds are recorded from independent audio devices with independent hardware (e.g., M1, M2, D1, D2, D3, etc.), such that the recording devices are not pre-synchronized as to time. Furthermore, the audio feeds include audio samples over time, which can have been recorded at the same or different sampling rates.

Act 1204 includes identifying a base feed and a first feed. In some instances, the base feed and the first feed are selected from the plurality of audio feeds according to predefined criteria, such as duration, sampling rate, or according to any other convention described herein. In some instances, the base feed and the first feed are selected by a user providing user input at a user interface of a computer system.

For example, if a user utilized a standalone microphone with superior sound recording attributes as one of the recording devices, the base feed can be selected as the feed recorded by the standalone microphone. In another example, if a user records an event with multiple video cameras, and one of the cameras has a built-in microphone with super sound recording attributes, the base feed is selected as the feed recorded by the built-in microphone that is connected to the camera device with superior sound recording attributes.

Act 1206 includes identifying a base segment and a first segment. The base segment is identified from the base feed, and the first segment is identified from the first feed. In some embodiments, the first segment and/or the base segment include the entire duration of the first feed and/or the base feed, respectively. In other embodiments, the base segment (or the first segment) is selected as a centrally located segment of the base feed. In some instances, the first segment and the base segment have the same duration, while in other instances they do not.

The base segment and the first segment, in some instances, are identified based on characteristics of the base feed and the first feed (e.g., duration of the feeds) and/or according to predefined criteria. For example, in some embodiments, the base segment and the first segment have a predetermined duration that is between 2 seconds and 10 seconds. In some embodiments, the segment duration is determined dynamically based on, for example, the duration of the feed(s). In some embodiments, the segments are selected to be offset from another part of the feeds by a predetermined or dynamically calculated amount. In other embodiments, the segments are selected to be centered around part of the feeds, such as Q1, Q2, or Q3. In some embodiments, the base segment and/or the first segment are identified based on a global or real-world time that is associated with the base feed and/or the first feed (e.g., a real-world or global time identified in metadata associated with the feeds).

Act 1208 includes determining a plurality of time-shifted first segments. In some instances, a granularity parameter is identified (e.g., by predefinition or dynamic calculation) and a unique multiple of the granularity parameter used as a time shift size to temporally offset each of the plurality of time-shifted first segments from the first segment (unshifted first segment). In some embodiments, the granularity parameter is a quantity of samples selected from a range between 4 samples and 64 samples. In some embodiments, the granularity parameter is a time parameter selected from a range of 0.08 ms to 16 ms.

Act 1210 includes determining a plurality of correlation values between the base segment and the plurality of time-shifted first segments. In some embodiments, this includes a separate correlation value for each of the plurality of time-shifted first segments relative to the base segment. In some instances, each of the plurality of correlation values are calculated as Pearson correlation coefficients.

Act 1212 includes identifying a particular time-shifted first segment that has a highest correlation value. Act 1214 includes determining a first offset value. In some instances, the first offset value corresponds to the particular time-shifted first segment that has the highest correlation value (identified in act 1212).

Act 1216 includes determining a plurality of refined first segments. In some embodiments, each of the plurality of refined first segments are temporally offset from the first segment by a unique multiple of a refined granularity parameter which is smaller than the granularity parameter previously used with reference to act 1208.

In some instances, each of the plurality of refined first segments are located within a refined cross-correlation range, which is calculated based on the first offset value determined in relation to act 1214.

Act 1218 includes determining a plurality of refined correlation values between the base segment and the plurality of refined first segments. In some embodiments, this includes a separate refined correlation value (e.g., a Pearson correlation coefficient) for each of the plurality of refined first segments relative to the base segment.

Act 1220 includes identifying a particular refined first segment that has a highest refined correlation value. Act 1222 includes determining a refined offset value. In some embodiments, the refined offset value corresponds to the particular refined first segment that has the highest refined correlation value (identified in act 1220).

Act 1224 includes synchronizing the first feed with the base feed based on the first offset value and/or the refined offset value. In some embodiments, this includes temporally offsetting the first feed by a temporal offset that is based on the selected first offset value and/or the refined offset value. In some instances, act 1224 includes modifying a temporal offset with the refined offset value.

Act 1224 may also include identifying supplementary content (e.g., video, captioning, metadata, other audio sub-tracks/sub-feeds or other content) recorded with and/or that is already temporally synchronized with the first feed (as part of the same first feed file and/or as a separate file) and thereafter parsing and synchronizing this supplemental content to the base feed as a new mixed/composite file. This act may also include excluding the underlying audio of the first feed that was first synchronized with the base feed from the resulting mixed/composite file comprising the base feed audio and the first feed supplementary content.

It will be appreciated that some or all of the aforementioned acts depicted in flow diagram 1200 can be performed between the base feed and any number of other feeds. For example, in some embodiments, after or simultaneous with performing the above-described acts with respect to a first feed/first segment, the system identifies a second feed of the plurality of audio feeds and a second segment of the second feed. The system also determines a plurality of time-shifted second segments, each of the plurality of time-shifted second segments being temporally offset from the second segment by the unique multiple of the granularity parameter. The system then determines a plurality of second correlation values between the base segment and the plurality of time-shifted second segments, including a separate second correlation value for each of the plurality of time-shifted second segments relative to the base segment. The system also identifies a particular time-shifted second segment from the plurality of time-shifted second segments that has a highest second correlation value from the plurality of second correlation values. The system then determines a second offset value corresponding to the particular time-shifted second segment having the highest second correlation value. Subsequently, the system synchronizes the second feed with the base feed by at least temporally offsetting the second feed and at least one of a video feed, image data, closed captioning data, metadata, or annotations associated with the second feed by a temporal offset that is based on the selected second offset value.

The disclosed embodiments may, in some instances, provide various advantages and practical applications over conventional systems and methods for synchronizing recordings. Some of these advantages and applications include providing users with a computer-implemented process for automatically and precisely synchronizing audio feeds which can reduce/eliminate human error and improve synchronization fidelity between different recordings of a same event from different devices that are not already synchronized with a same real-world time and/or that have different start times, end times and/or durations for the recorded event. It can also facilitate the manner in which a user can time synchronize supplemental content from different devices based on underlying audio feeds for the different devices.

Having just described the various features and functionalities of some of the disclosed embodiments, attention is again directed to FIG. 2, which, as noted above illustrates an example computer system 200 and components thereof that may incorporate and/or be used to facilitate the disclosed embodiments.

The computer system 200 may take various different forms. For example, the computer system 200 may be a distributed system that includes one or more connected computing components/devices that are in communication with each other. Accordingly, the computer system 200 may be embodied in any form. By way of example, the computer system 200 may include a projector, desktop computer, a laptop, a tablet, a mobile phone, server, a stand-alone computing system, a distributed computer system, data center and/or any other computer system.

In its most basic configuration, the computer system 200 includes various different components. For example, FIG. 2 shows that computer system 200 includes at least one hardware processing unit 202 (aka a "processor"), input/output (I/O) interfaces 204, communication channels 216, and storage 206. More detail on the hardware processing unit 202 will be presented momentarily. Computer system 200 may also include other elements not explicitly shown, such as graphics rendering engines and/or sensors. For example, a graphics rendering engine may be configured, with the hardware processing unit 202, to render one or more objects to a user via a display (e.g., one of the I/O interface 204 that display the graphs, audio feed images and other disclosed content to the user).

The storage 206 may be physical system memory, which may be volatile, non-volatile, or some combination of the two. The term "memory" may also be used herein to refer to non-volatile mass storage such as physical storage media. If the computer system 200 is distributed, the processing, memory, and/or storage capability may be distributed as well. As used herein, the term "executable module," "executable component," or even "component" can refer to software objects, routines, or methods that may be executed on the computer system 200. The different components, modules, engines, and services described herein may be implemented as objects or processors that execute on the computer system 200 (e.g. as separate threads).

The disclosed embodiments may comprise or utilize a special-purpose or general-purpose computer including computer hardware, such as, for example, one or more processors (such the hardware processing unit 202) and system memory (such as storage 206), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Further, the computer system 200 may also be connected through communication channels 216 to one or more wired or wireless networks 218 to remote systems(s) 240 that are configured to perform any of the processing described with regard to computer system 200.

A "network," like the network 218 shown in FIG. 2, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 200 will include one or more communication channels 216 that are used to communicate with the network 218. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RANI within a network interface module (e.g., a network interface card or "MC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 202). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for synchronizing multiple audio feeds, the system comprising:
   one or more processors; and
   one or more computer-readable media having stored computer-executable instructions that are operable, when executed by the one or more processors, to cause the system to perform the following:
   obtain a plurality of audio feeds comprising a plurality of audio samples over time;
   identify a base feed of the plurality of audio feeds and a first feed of the plurality of audio feeds;
   identify a base segment of the base feed and a first segment of the first feed;
   after first identifying the first segment, apply different temporal offsets to the first segment to create a plurality of different time-shifted first segments associated with the time-shifted first segment, each of the plurality of time-shifted first segments corresponding to a different temporally offset from the first segment;
   determine a plurality of correlation values between the base segment and each of the plurality of different time-shifted first segments, including a separate correlation value for each time-shifted segment of the plurality of different time-shifted first segments relative to the base segment;
   identify a particular time-shifted first segment from the plurality of different time-shifted first segments that has a corresponding highest correlation value of the plurality of correlation values corresponding to the plurality of different time-shifted first segments;
   determine a first offset value corresponding to the particular time-shifted first segment corresponding to the highest correlation value; and
   synchronize the first feed with the base feed by at least temporally offsetting the first feed by a temporal offset that is based on the determined first offset value.

2. The system of claim 1, wherein each of the plurality of time-shifted first segments is temporally offset from the first segment by a unique multiple of a granularity parameter comprising a quantity of samples selected from a range between 4 samples and 64 samples.

3. The system of claim 1, wherein each of the plurality of time-shifted first segments is temporally offset from the first segment by a unique multiple of a granularity parameter comprising a time parameter selected from a range from 0.08 ms to 16 ms.

4. The system of claim 1, wherein the base feed is recorded by a standalone microphone.

5. The system of claim 1, wherein the base feed is recorded by a microphone that is connected to a camera device.

6. The system of claim 1, wherein the base segment and the first segment have a same duration.

7. The system of claim 1, wherein the base segment and the first segment is identified based on a global time that is associated with the base feed and the first feed.

8. The system of claim 1, wherein the base segment is a segment selected based on being a centrally located segment of a plurality of segments of the base feed.

9. The system of claim 1, wherein the base segment and the first segment have a predetermined duration selected to be a duration of between 2 seconds and 10 seconds.

10. The system of claim 1, wherein the plurality of correlation values between the base segment and the plurality of time-shifted first segments are calculated as Pearson correlation coefficients.

11. The system of claim 1, wherein synchronizing the first feed with the base feed includes synchronizing the base feed with supplemental content comprising at least one of: a video feed, image data, closed captioning data, metadata, or annotations associated with the first feed and by temporally offsetting the supplemental content by the first offset value.

12. The system of claim 1, wherein the computer-executable instructions are further operable, when executed by the one or more processors, to cause the system to:
    identify a second feed of the plurality of audio feeds and a second segment of the second feed;
    determine a plurality of time-shifted second segments, each of the plurality of time-shifted second segments being temporally offset from the second segment;
    determine a plurality of second correlation values between the base segment and the plurality of time-shifted second segments, including a separate second correlation value for each of the plurality of time-shifted second segments relative to the base segment;
    identify a particular time-shifted second segment from the plurality of time-shifted second segments that has a highest second correlation value from the plurality of second correlation values;
    determine a second offset value corresponding to the particular time-shifted second segment having the highest second correlation value; and
    synchronize the second feed with the base feed by at least temporally offsetting the second feed by a temporal offset that is based on the determined second offset value.

13. The system of claim 1, wherein synchronizing the first feed with the base feed includes modifying the temporal offset with a refined offset value, the refined offset value corresponding to a particular refined first segment having a highest refined correlation value, wherein the particular refined first segment is identified from a plurality of refined first segments, each of the plurality of refined first segments being temporally offset from the first segment by a unique multiple of a refined granularity parameter that is smaller than the temporal offset that is modified.

14. The system of claim 1, wherein the base feed is identified and selected from the plurality of audio feeds based on the base feed having a determined highest quality or fidelity of the plurality of feeds for a particular event.

15. The system of claim 1, wherein the base feed is identified and selected from the plurality of audio feeds based on the base feed having a highest quantity of content relative to other feeds in the plurality of feeds for a particular event.

16. The system of claim 1, wherein the base feed is identified and selected from the plurality of audio feeds based on the base feed being determined to have been in closest proximity, of the plurality of feeds, to a particular audio source.

17. A method for synchronizing multiple audio feeds, the method comprising:
    obtaining a plurality of audio feeds comprising a plurality of audio samples over time;
    identifying a base feed of the plurality of audio feeds and a first feed of the plurality of audio feeds;
    identifying a base segment of the base feed and a first segment of the first feed;
    after first identifying the first segment, applying different temporal offsets to the first segment to create a plurality of different time-shifted first segments associated with the time-shifted first segment, each of the plurality of time-shifted first segments corresponding to a different temporally offset from the first segment;
    determining a plurality of correlation values between the base segment and each of the plurality of different time-shifted first segments, including a separate correlation value for each time-shifted segment of the plurality of different time-shifted first segments relative to the base segment;
    identifying a particular time-shifted first segment from the plurality of different time-shifted first segments that has a corresponding highest correlation value of from the plurality of correlation values corresponding to the plurality of different time-shifted first segments;
    determining a first offset value corresponding to the particular time-shifted first segment corresponding to the highest correlation value; and
    synchronizing the first feed with the base feed by at least temporally offsetting the first feed by a temporal offset that is based on the determined first offset value.

18. The method of claim 17, further comprising:
    identifying a second feed of the plurality of audio feeds and a second segment of the second feed;
    determining a plurality of time-shifted second segments, each of the plurality of time-shifted second segments being temporally offset from the second segment;
    determining a plurality of second correlation values between the base segment and the plurality of time-shifted second segments, including a separate second correlation value for each of the plurality of time-shifted second segments relative to the base segment;
    identifying a particular time-shifted second segment from the plurality of time-shifted second segments that has a highest second correlation value from the plurality of second correlation values;
    determining a second offset value corresponding to the particular time-shifted second segment having the highest second correlation value; and
    synchronizing the second feed with the base feed by at least temporally offsetting the second feed and at least one of a video feed, image data, closed captioning data, metadata, or annotations associated with the second feed by a temporal offset that is based on the determined second offset value.

19. The method of claim 17, further comprising:
    determining a plurality of refined first segments, each of the plurality of refined first segments being temporally offset from the first segment by a unique multiple of a refined granularity parameter that is smaller than a granularity parameter used to set the different temporal offsets;
    determining a plurality of refined correlation values between the base segment and the plurality of refined first segments, including a separate refined correlation value for each of the plurality of refined first segments relative to the base segment;
    identifying a particular refined first segment form the plurality of refined first segments that has a highest refined correlation value from the plurality of refined correlation values;

determining a refined offset value corresponding to the particular refined first segment having the highest refined correlation value; and modifying the temporal offset with the refined offset value.

20. The method of claim 17, wherein the base segment or the first segment have a same duration.

21. The method of claim 17, wherein the base segment is a segment selected based on being a centrally located segment of a plurality of segments of the base feed.

22. The method of claim 17, wherein the plurality of correlation values between the base segment and the plurality of time-shifted first segments are calculated as Pearson correlation coefficients.

23. One or more hardware storage device having stored thereon computer-executable instructions, the computer-executable instructions being executable by one or more processors of a computer system to cause the computer system to:

obtain a plurality of audio feeds comprising a plurality of audio samples over time;

identify a base feed of the plurality of audio feeds and a first feed of the plurality of audio feeds;

identify a base segment of the base feed and a first segment of the first feed;

after first identifying the first segment, apply different temporal offsets to the first segment to create a plurality of different time-shifted first segments associated with the time-shifted first segment, each of the plurality of time-shifted first segments corresponding to a different being temporally offset from the first segment;

determine a plurality of correlation values between the base segment and each of the plurality of different time-shifted first segments, including a separate correlation value for each time-shifted segment of the plurality of different time-shifted first segments relative to the base segment;

identify a particular time-shifted first segment from the plurality of different time-shifted first segments that has a corresponding highest correlation value of the plurality of correlation values corresponding to the plurality of different time-shifted first segments;

determine a first offset value corresponding to the particular time-shifted first segment corresponding to the highest correlation value; and synchronize the first feed with the base feed by at least temporally offsetting the first feed by a temporal offset that is based on the determined first offset value.

* * * * *